United States Patent [19]
Jacobson

[11] Patent Number: 6,014,940
[45] Date of Patent: Jan. 18, 2000

[54] SURFACE EFFECT CRAFT

[76] Inventor: Clayton Jacobson, P.O. Box 7836, Incline Village, Nev. 89452

[21] Appl. No.: 09/082,459

[22] Filed: May 20, 1998

Related U.S. Application Data

[63] Continuation-in-part of application No. 08/664,407, Jun. 17, 1996, which is a continuation-in-part of application No. 08/200,240, Feb. 22, 1994, Pat. No. 5,526,764, which is a continuation-in-part of application No. 07/540,887, Jun. 20, 1990, Pat. No. 5,357,894, which is a continuation of application No. 07/334,760, Apr. 6, 1989, abandoned, which is a continuation of application No. 06/856,674, Apr. 25, 1986, abandoned.

[51] Int. Cl.$^7$ .................................................. B63B 1/00
[52] U.S. Cl. ..................... 114/271; 114/67 A; 244/12.1; 244/233
[58] Field of Search ................................ 114/67 A, 271, 114/272; 244/12.1, 23 R, 36

[56] References Cited

U.S. PATENT DOCUMENTS

| | | | |
|---|---|---|---|
| Re. 30,978 | 6/1982 | Jacobson | 114/270 |
| D. 342,717 | 12/1993 | Mzdeza et al. | D12/233 |
| D. 357,647 | 4/1995 | Blum | D12/5 |
| 1,858,762 | 5/1932 | Bellanca | 244/55 |
| 2,272,661 | 2/1942 | Finley | 114/272 |
| 2,311,161 | 2/1943 | Dornier | 244/106 |
| 2,354,453 | 7/1944 | Gazda | 114/272 |
| 2,650,780 | 9/1953 | Northrup et al. | 244/36 |
| 2,989,269 | 6/1961 | Le Bel | 244/36 |
| 3,094,962 | 6/1963 | Goar | 114/271 |
| 3,176,647 | 4/1965 | Grengs et al. | 440/37 |
| 3,190,582 | 6/1965 | Lippisch | 244/12 |
| 3,317,161 | 5/1967 | Sawyer | 244/36 |
| 3,372,891 | 3/1968 | Malvestuto, Jr. | 244/12.1 |
| 3,576,300 | 4/1971 | Palfreyman | 244/36 |
| 3,627,235 | 12/1971 | Lippisch | 244/105 |
| 3,661,111 | 5/1972 | Lippisch | 114/67 A |
| 3,830,448 | 8/1974 | Lippisch | 244/2 |
| 3,952,678 | 4/1976 | Weston | 114/272 |
| 4,159,086 | 6/1979 | Schonfelder | 244/12.1 |
| 4,240,598 | 12/1980 | Espin et al. | 244/35 R |
| 4,365,578 | 12/1982 | Schellhaas | 114/67 A |
| 4,437,426 | 3/1984 | Latham | 114/103 |
| 4,566,657 | 1/1986 | Grow | 244/90 |
| 4,828,204 | 5/1989 | Friebel | 244/15 |

(List continued on next page.)

FOREIGN PATENT DOCUMENTS

| | | |
|---|---|---|
| 24955 | 6/1997 | Australia . |
| 24955 | 1/1998 | Australia . |

OTHER PUBLICATIONS

"Lifting–body Glider", Flight International, p. 70, Jul. 1965.
Tim Cole, *Popular Mechanics* (Jul. 1989), "License to Fly", pp. 57–59, 124–125.
Abe Dane, *Popular Mechanics* (May 1992), "Wingships", pp. 35–38, 123.
Kevin Cameron, *Popular Science* (Apr. 1992), "The Boat That Flies", pp. 57–60, 111.

*Primary Examiner*—Jesus D. Sotelo
*Attorney, Agent, or Firm*—Lyon & Lyon LLP

[57] ABSTRACT

A surface effect craft of simple construction achieving improved operational stability and performance at various speeds. The craft includes first and second main wing sections merge into the central hull to form a continuous aerodynamic wing structure. The wing structures are very thick with maximum thickness ratio of wing thickness to chord length on the order of 25–30% with the first and second wing sections being swept back, merging into first and second vertical side wall directional stabilizers, the wing shaped structure forming a generally U-shaped rear section (as best viewed from a rear plan or sectional view). The craft preferably includes an aft elevated secondary wing structure extending between the first and second vertical side wall directional stabilizers whereby both the main wing sections and the aft elevated secondary wing structure provide lift. The aft elevated secondary wing structure and the vertical side wall directional stabilizers form a box-shaped rear duct section within which a ducted fan propulsion is disposed.

24 Claims, 21 Drawing Sheets

U.S. PATENT DOCUMENTS

| | | | |
|---|---|---|---|
| 4,867,396 | 9/1989 | Wainfan | 244/215 |
| 5,086,993 | 2/1992 | Wainfan | 244/48 |
| 5,105,898 | 4/1992 | Bixel, Jr. | 180/117 |
| 5,357,894 | 10/1994 | Jacobson | 114/272 |
| 5,395,071 | 3/1995 | Felix | 244/35 |
| 5,402,969 | 4/1995 | Shea | 244/36 |
| 5,464,069 | 11/1995 | Gifford | 180/116 |
| 5,526,764 | 6/1996 | Jacobson | 114/272 |
| 5,727,495 | 3/1998 | Reslein | 180/116 |

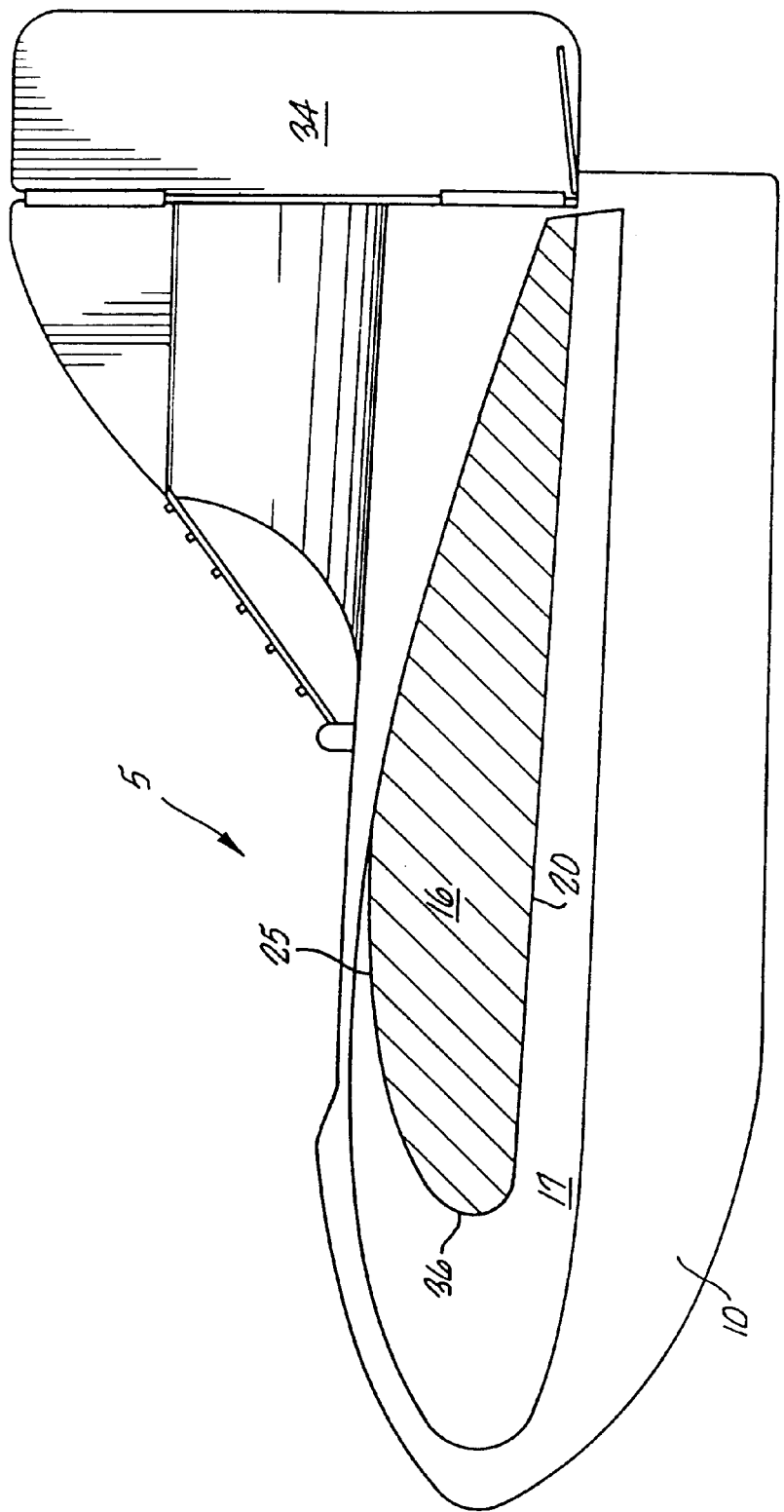

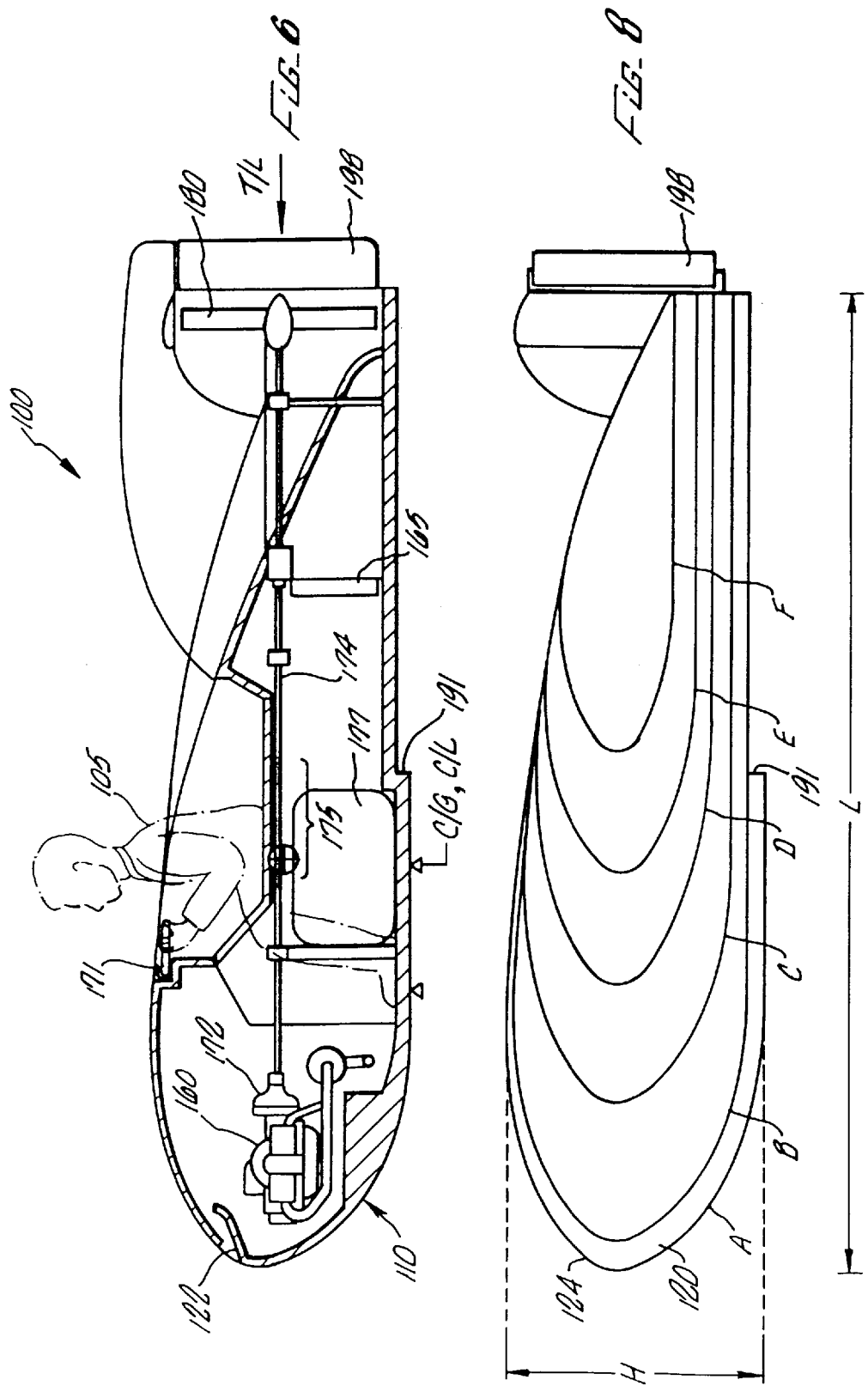

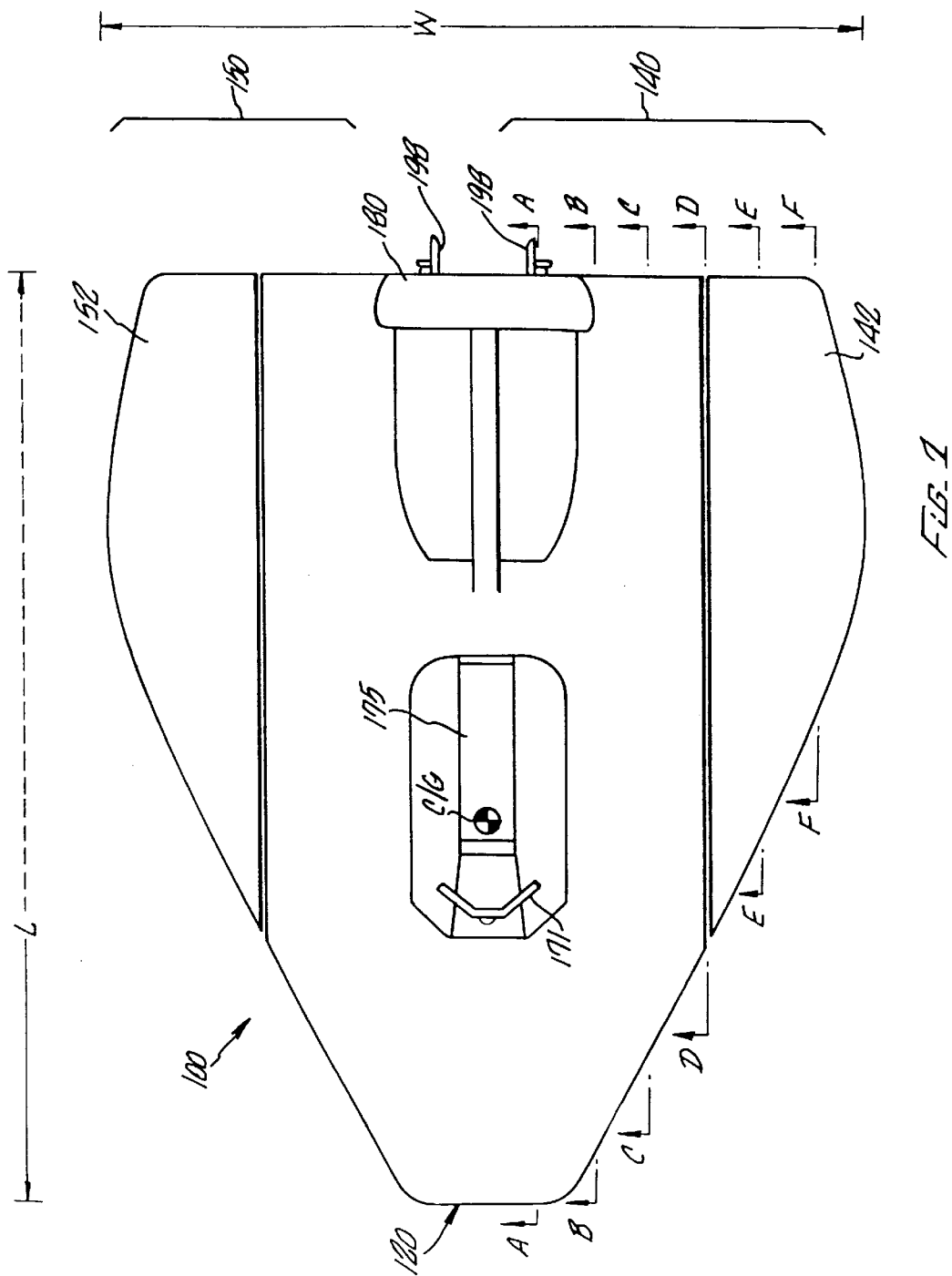

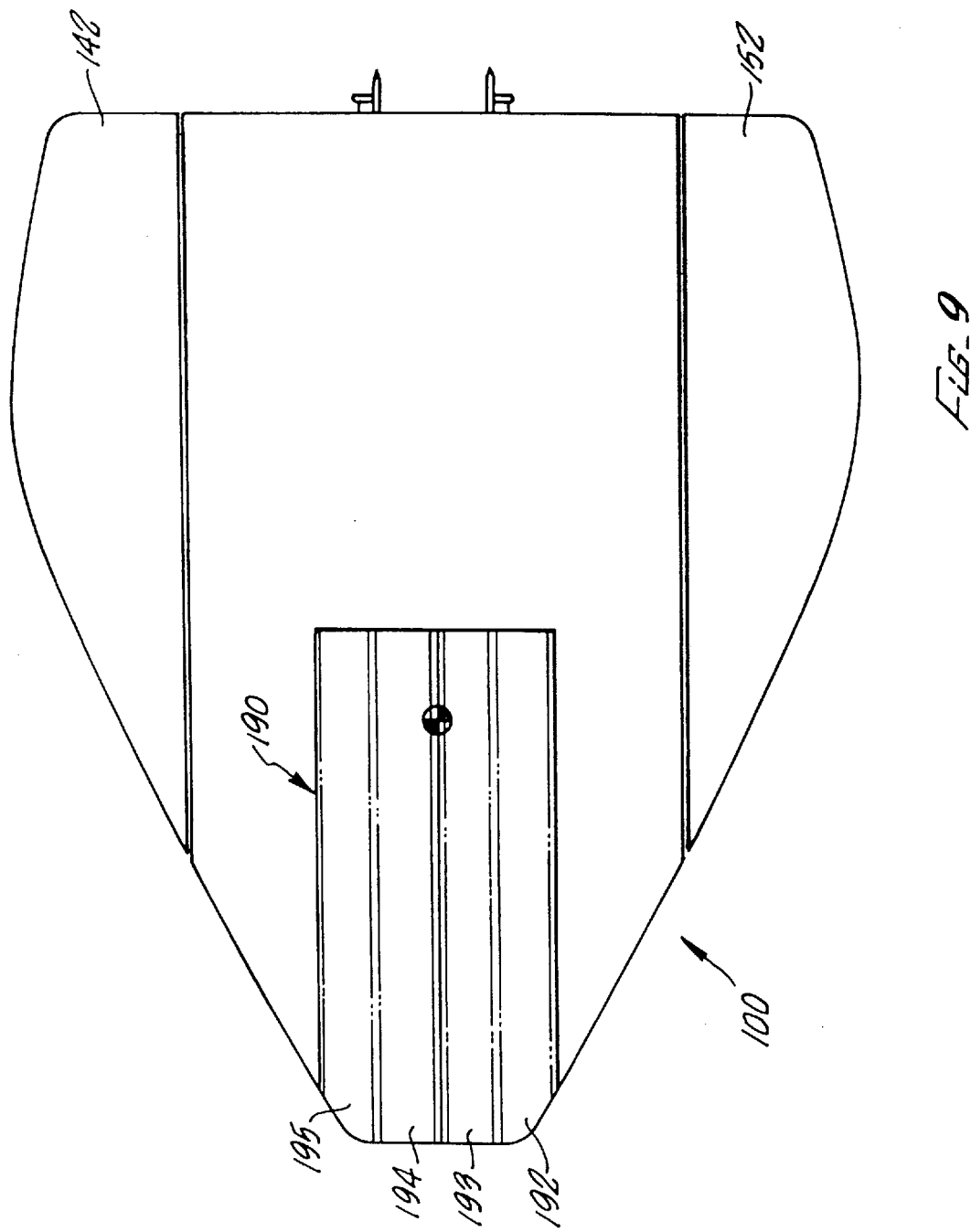

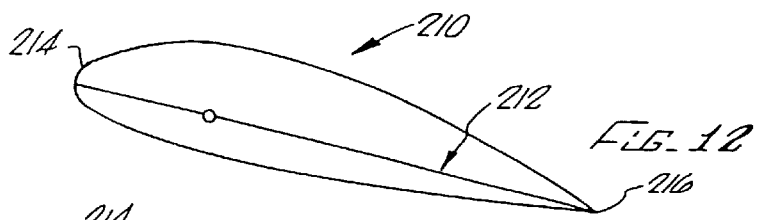
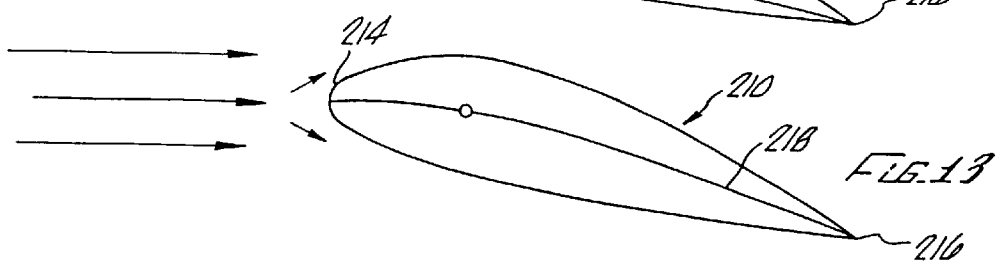
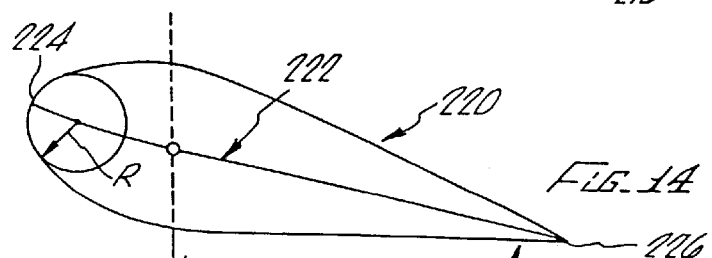
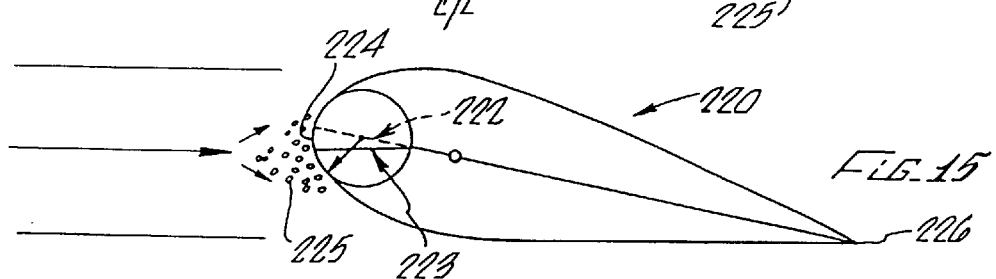
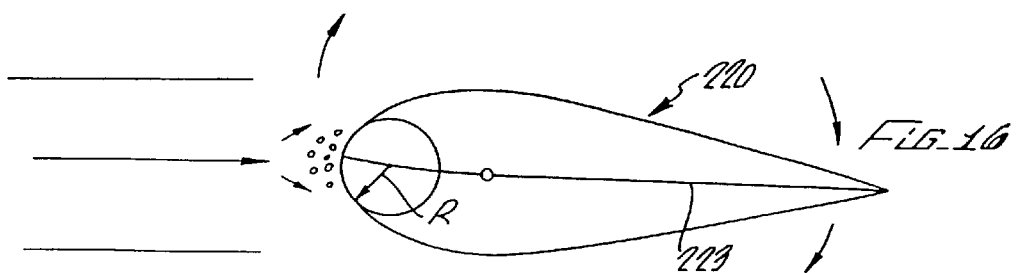
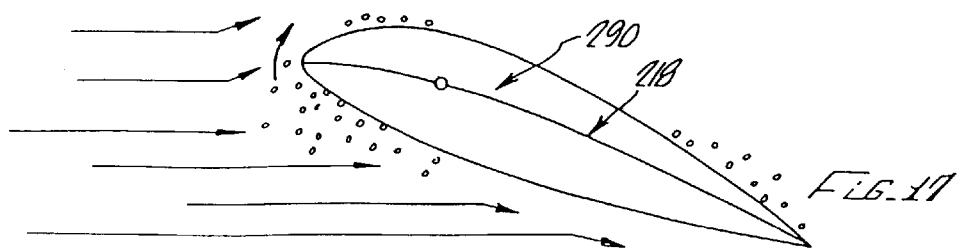

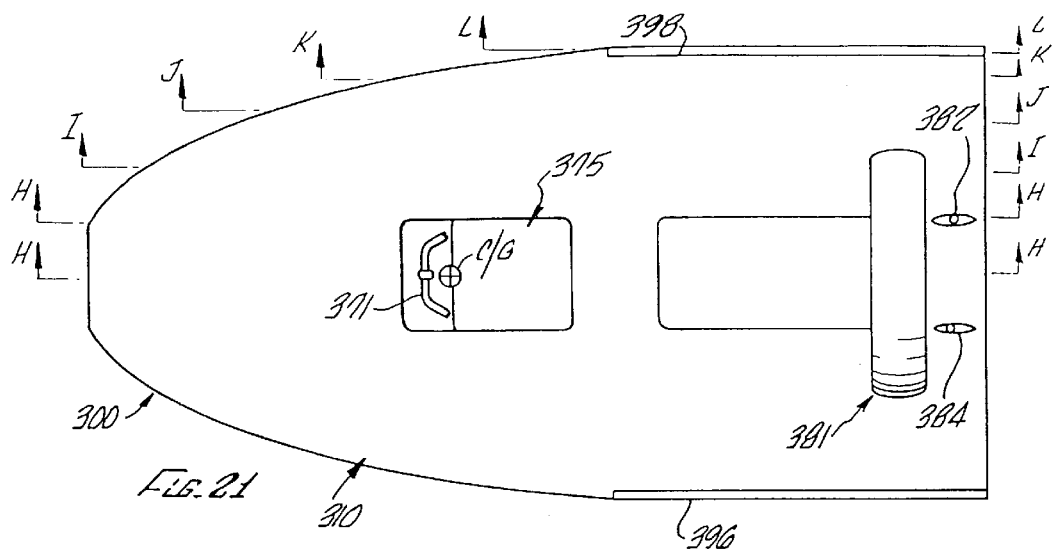
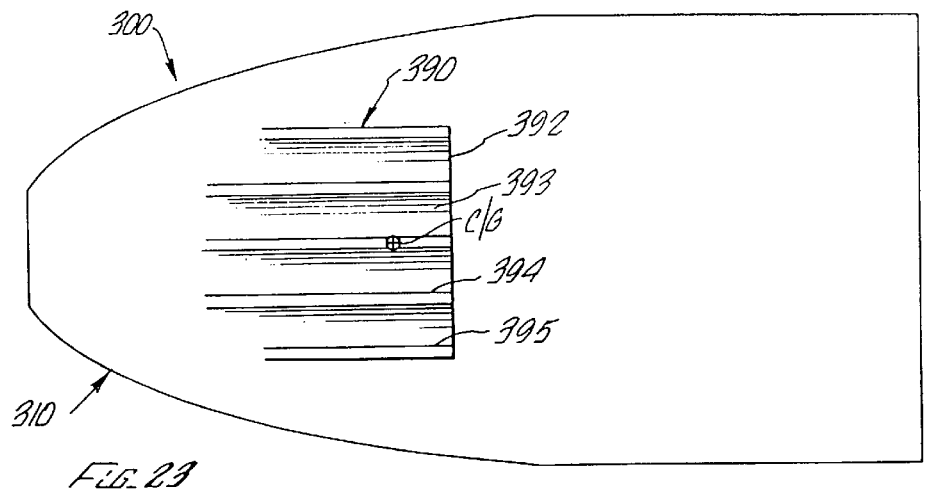
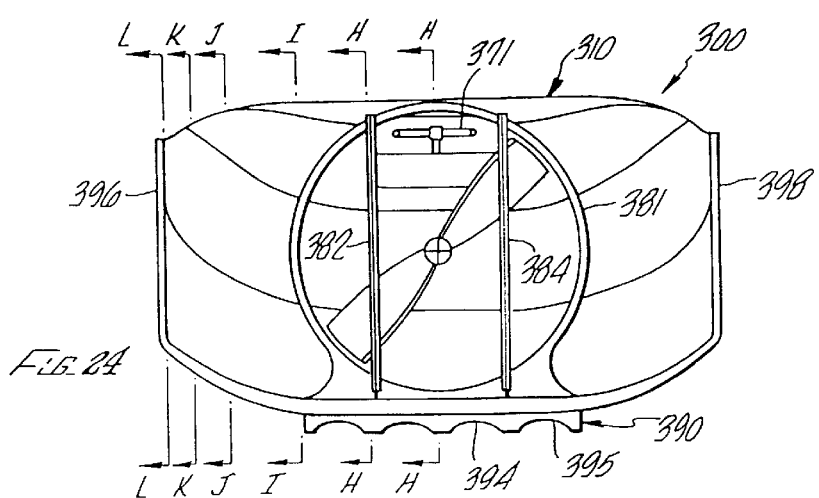

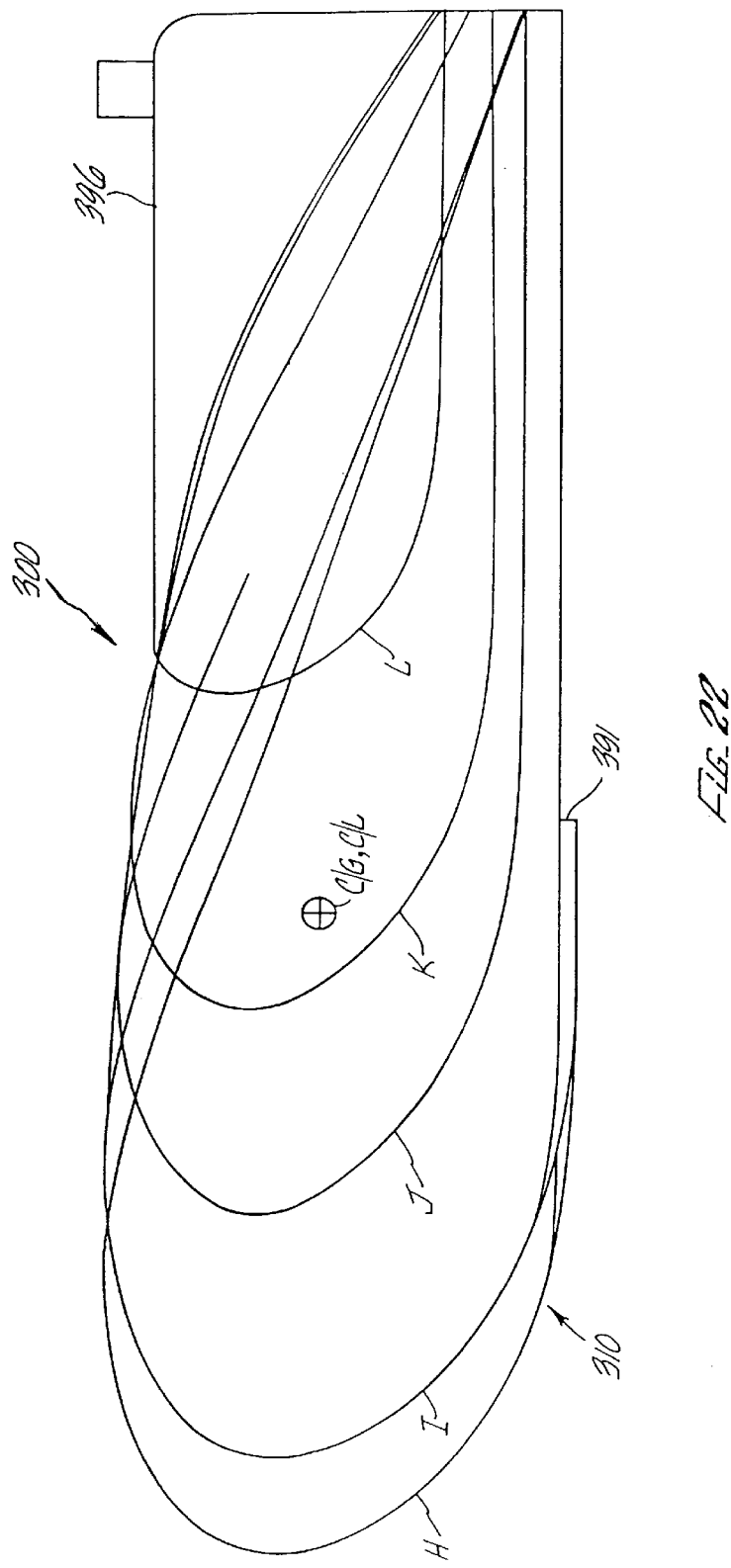

SURFACE EFFECT CRAFT

RELATED U.S. APPLICATION DATA

This application is a continuation-in-part of Ser. No. 08/664,407, filed on Jun. 17, 1996, which is a continuation-in-part of Ser. No. 08/200,240 filed Feb. 22, 1994, now U.S. Pat. No. 5,526,764, which is a continuation-in-part of Ser. No. 07/540,887 filed Jun. 20, 1990, now U.S. Pat. No. 5,357,894, which is a continuation of Ser. No. 07/334,760 filed Apr. 6, 1989, abandoned, which is a continuation of Ser. No. 06/856,674 filed Apr. 25, 1986, abandoned. Claim for priority to these applications is limited to that set forth in the declaration filed by the inventor.

FIELD OF THE INVENTION

The field of the present invention relates to flying crafts and to watercrafts and in particular to a watercraft having an aerodynamic configuration having improved stability and performance especially at transitional (transitioning from water to air travel) and at higher speeds. In its preferred configuration, the craft may employ ground effect for aerodynamic performance in proximity to the surface.

BACKGROUND OF THE INVENTION

For many years, designers of pleasure crafts have been researching water-borne craft designs which have aerodynamic elements generating lift force on the craft structure when at speed to assist raising the craft above its at rest buoyant draft. It is desirable to reduce viscous drag on the craft hull for providing increased speed and/or efficiency over a craft with a conventional design having the same weight and power. Early designs effectuating this objective are evidenced by the hydroplane style boat which comprises a pair of structurally supported sponsons separated by a raised hull floor, which form an underlying tunnel through which air is flowed. The underflowing airstream may also provide a lift force through the force of the airstream against the hull floor or through compression of the entering air mass between the water surface and the hull floor of the boat, or both.

The hull of a hydroplane is supported by buoyant force generally along its entire underside, including the hull floor and sponsons, when at rest. Under power, the hydroplane boat is substantially supported by hydrodynamic force acting against the outwardly and forwardly positioned sponsons, and by radial thrust from the prop extending from the rear of the hull. This triangular footing provides reasonable stability in smooth surfaced water; however, the wide beam of the sponsons and airflow through the centrally defined tunnel can experience decreased stability, particularly in rough surface conditions.

Generally, hydroplane style boats are designed with the cockpit in opposition to the powerplant, i.e. the cockpit is in the front if the engine is in the rear and vice versa, for heavier designs. For lighter designs, for instance boats under fifteen feet in length, the cockpit is generally positioned in the stern so that the pilot is within reach of an outboard type motor mounted to the transom of the boat.

Tri-hull boat designs, exemplified for instance in U.S. Pat. No. 3,952,678, have been described as improvements over the basic hydroplane style hull. Such boat designs comprise a third water borne hull generally positioned centrally between the sponsons to assist in dynamic stability. The depths of the hull and sponsons are generally equal, as shown, to provide a uniform and broad base support for the hull in the water, with their underlying surfaces being flat and horizontally disposed.

The third central hull is thought to provide additional stability in rough surface conditions or high wind conditions which may create an unstable situation for a hydroplane style boat. Additionally, a forwardly rising support structure for the sponsons is described which provides an upwardly and forwardly angled undersurface which is bounded by the central hull and the respective sponsons. This undersurface is used to compress an airstream received when the boat is in motion to provide aerodynamic lift force on the underside of the structure in addition to the hydrodynamic lift force generated on the hull when the boat is under power. The boat described in the U.S. Pat. No. 3,952,678 appears to be larger than 20 feet in length and has the cockpit positioned rearwardly with the engine placed in an opposing forward position.

Another differing style craft which is substantially aerodynamic in design while utilizing both aerodynamic and hydrodynamic lift forces during the transitional period from standstill through surface departure, is described in U.S. Pat. No. 3,190,582 and related U.S. Pat. Nos. 3,627,235 and 3,830,448. The aircraft disclosed therein is, at rest, supported on forwardly and outwardly extended sponsons joined to a central craft fuselage. The sponsons are joined to the fuselage by airfoil shaped structures or wings extending outwardly and downwardly to the sponsons from the fuselage to provide a reverse dihedral wing configuration. This design positions forward portions of the fuselage above the sponsons such that the forward portion of the fuselage cannot contact the surface of the water on which the craft is supported. The wing structures extend rearwardly from the outwardly and downwardly directed leading edge which extends substantially perpendicular with the longitudinal axis of the fuselage, to an inwardly swept back rearward edge converging at the tail of the fuselage. This wing configuration provides a triangular shaped frontal opening from the nose of the fuselage to the interior side of each respective sponson to define an underlying space below the fuselage and wing structures which is closed at the rearward edge of the wing against the surface of the water. The rearward edge of the wing is generally at the same vertical height as the sponsons and when at rest meets the water surface from the sponson to the rear of the fuselage. Thus at rest the craft rests on the sponsons and the rearward edge of the wing and the rearward end of the fuselage, all of which are in contact with the water to support the aircraft.

When the aircraft begins operation and accelerates, the air flow into the triangular shaped frontal opening of the wing begins to build air pressure under the aircraft, between the undersurface of the wings and fuselage and the surface of the water. Maximum aerodynamic pressure builds at the rearward edge of the wings so that the rear of the aircraft lifts from the surface of the water first and the aircraft is supported by hydrodynamic pressure on the sponsons and the aerodynamic pressure along the rearward edge of the wings.

Operation of the aircraft as velocity increases becomes increasingly unstable however due to loss of aerodynamic lift as the rear edges of the wings rise and the ram air and ground effects lift dissipate resulting in difficulty in pitch or attitude control of the aircraft. Due to the reverse dihedral configuration of the wings, roll of the craft in one direction or the other tends to increase rotation in the same direction. This increased rotation is caused by increased lift on the rising (more horizontal) wing as compared to the other, a phenomena which additionally causes attitude and roll instability. Forwardly and outwardly positioned wing tips floats may impact the water and if only one wing tip impacts the water may cause the craft to cartwheel with undesirable results.

If the aircraft is piloted through the transitional period, the aircraft attains a stable and substantially horizontal pitch attitude and airflow over the wings generates aerodynamic lift to raise the craft from the water surface into free flight.

The aircraft fuselage is configured in a common design having the cockpit positioned as far forward as is practical in view of other major components contained in the fuselage, such as engine, avionics, etc. which are positioned in the nose structure of the craft.

A watercraft comprising a singular water borne hull which additionally utilizes a wing(s) for stability and control in operation is known as a Ski Plane® which is manufactured by a concern known as Ski-Plane, Inc. of Newport Beach, Calif. The hull of the Ski Plane® is a narrow cigar-shaped structure which has a primary substantially flat and narrow undersurface extending the length of the hull. A pair of secondary and adjacent horizontal undersurface are disposed on either side and are part of the hull, beginning with a raised surface portion approximately ⅓ along the length of the hull from the front and curved downwardly and rearwardly to a flat undersurface contiguous with the primary undersurface approximately midway along the length of the hull. The secondary undersurface generally provided to aid high speed stability while decreasing the area of undersurface in contact with the water to reduce viscous drag.

A pair of wing structures extend laterally from the rear of the craft and exhibit a slight dihedral angle with the hull. Each wing structure ends with a downwardly curved portion or "dropping edge" which acts to restrict lateral flow of air from beneath the wing to improve stall characteristics, i.e. reduce the speed at which stall occurs. Ailerons extend along the rearward edge of each wing structure to assist in rotational control of the craft when at speed. A fixed laterally extending winglet is also provided at the nose of the craft.

The Ski Plane® is powered by a typical outboard motor mounted to the transom of the hull to propel the craft and generate primary rotational control through a driving propeller disposed below the surface of the water. A pair of cockpits are provided in a generally forward position of the hull. Major control, fuel and drive components are mounted within the stern in the area where the wing structures are attached.

All of these crafts have limitations in stability, efficiency and/or performance. A watercraft design having superior stability, efficiency or performance would therefore be desirable.

SUMMARY OF THE INVENTION

The present invention is directed to a flying craft having a central hull and first and second main wing sections. In a preferred embodiment, the first and second main wing sections merge into the central hull to form a continuous wing structure. The wing structures are very thick with maximum thickness ratio of wing thickness to chord length on the order of 25–30% with the first and second wing sections being swept back, merging into first and second vertical side wall directional stabilizers, the wing shaped structure forming a generally U-shaped rear section (as best viewed from a rear plan or sectional view). The craft preferably includes an aft elevated secondary wing structure extending between the first and second vertical side wall directional stabilizers whereby both the main wing sections and the aft elevated secondary wing structure provide lift. The aft elevated secondary wing structure and the vertical side wall directional stabilizers form a box-shaped rear duct section within which a propulsion means (e.g. a ducted fan) is disposed.

Preferably, the central hull has a concave shaped undersurface which extends from the bow rearwardly underneath the craft to the stern to improve hydrodynamic lift. Each of the sponsons (if any) also has a concave shaped surface or inwardly formed scallop along its undersurface to improve performance and assist in obtaining directional stability of the watercraft. Preferably the concave undersurface of each sponson is directed slightly outwardly and downwardly from the center of the craft.

Preferably, the watercraft is designed to have a mass distribution which enables a pilot to control the attitude of the watercraft through the control mechanisms and by the positioning of the pilot's body within a cockpit contained in a central hull. A cockpit is formed along the longitudinal axis of the central hull preferably forward of the mid position to provide a seating position for a pilot. The mass distribution of the craft is designed such that the center of gravity of the craft lies within a longitudinal range beneath a seating position for a pilot in the cockpit. This permits the pilot to utilize body movement to control the attitude of the watercraft when in operation. The mass elements of the craft are distributed in the central hull to place the center of gravity within the defined longitudinal range below the seating position of the pilot. In a preferred configuration, the power plant is positioned in the nose or bow of the watercraft and the propulsion system is positioned in the stern. Drive means are provided extending below the seating position of the pilot to transfer power from the powerplant to the propulsion system. Fuel storage is preferably positioned immediately below the seating position of the pilot within the longitudinal range of the center of gravity so that fuel usage will not substantially disturb the mass distribution of the watercraft.

The propulsion system is preferably a ducted fan positioned in the stern of the watercraft with an air intake immediately behind the seating position of the pilot in the cockpit. The ducted fan preferably includes torque control means to eliminate torque forces characteristic of the fan from acting on the watercraft. A rudder may be provided behind the outlet of the ducted fan to provide turning and yaw control. Additional control surfaces may be provided to obtain roll and pitch control.

DESCRIPTION OF THE DRAWINGS

FIG. 5 is a cross sectional view of the watercraft of FIG. 3 taken along line 5—5 showing the aerodynamic shape of the wing structure;

FIG. 6 is a side view in partial cross section of an alternate watercraft embodiment according to the present invention;

FIG. 7 is a top plan view of the watercraft of FIG. 6;

FIG. 8 is a side view of the watercraft of FIG. 7 diagrammatically illustrating the wing shape cross sections A—A through F—F of FIG. 7;

FIG. 9 is a bottom plan view of the watercraft of FIG. 6;

FIG. 12 is a diagrammatic drawing of wing shape showing a chordline;

FIG. 13 is a diagrammatic drawing of the wing shape of FIG. 12 showing a meanline;

FIG. 14 is diagrammatic drawing of a wing shape according to a preferred embodiment of the present application in normal attitude showing the upwardly curved meanline;

FIG. 15 is a diagrammatic drawing of the wing shape of FIG. 14 showing air flow thereacross in normal operating condition;

FIG. 16 is a diagrammatic drawing of the wing shape of FIG. 14 in a downwardly pitched condition showing air flow thereacross;

FIG. 17 is a diagrammatic drawing of a conventional wing shape showing air flow thereacross in a pitched up condition;

FIG. 22 is a cross sectional side view of FIG. 21 diagrammatically illustrating the wing shape cross sections A—A through F—F;

FIG. 23 is a bottom plan view of the watercraft of FIG. 18;

FIG. 24 is a rear elevation view of the watercraft of FIG. 18;

FIG. 27 is a top left side perspective view of craft incorporating the preferred wing design and body shape of the embodiments of FIGS. 18–26 into a commercial-size vehicle;

PREFERRED EMBODIMENTS OF THE PRESENT INVENTION

Preferred embodiments of the present application will now be described with respect to the drawings. To facilitate description, any numeral representing an element in one figure will represent the same element in any other figure.

Figure 1:
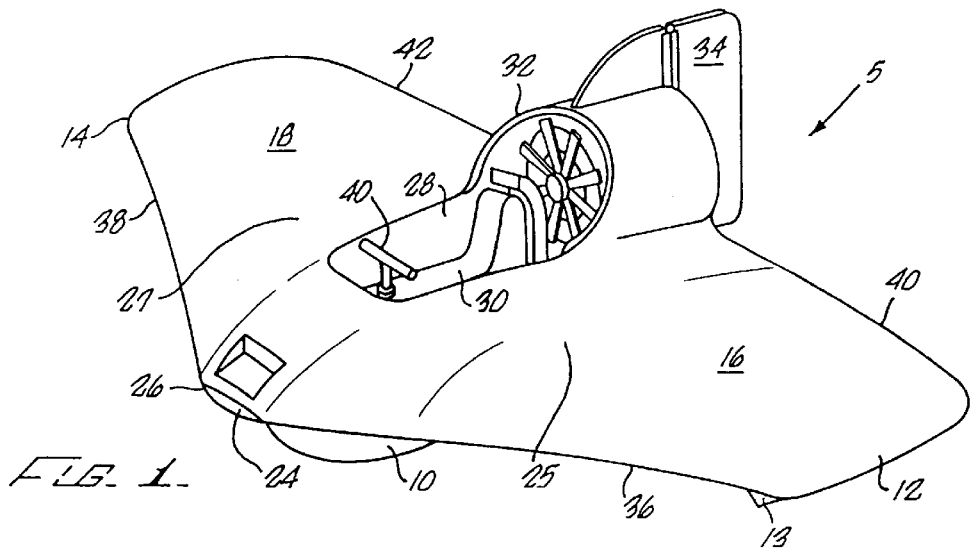
FIG. 1 is a downwardly directed left side perspective view of a preferred watercraft according to the present invention.
Figure 2:
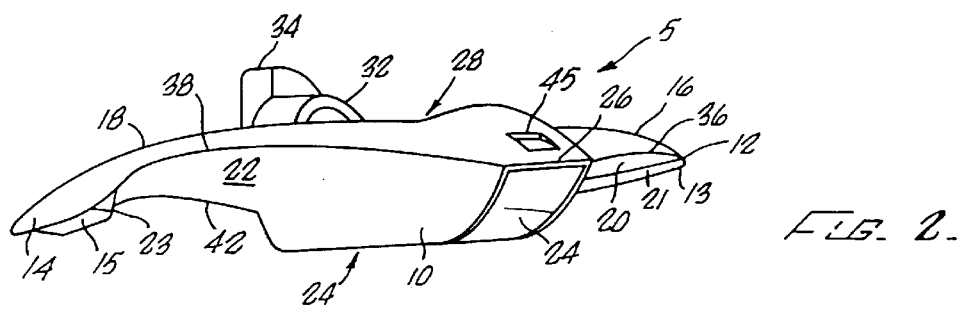
FIG. 2 is an upwardly directed right side perspective view of the watercraft of FIG. 1.
Figure 3:
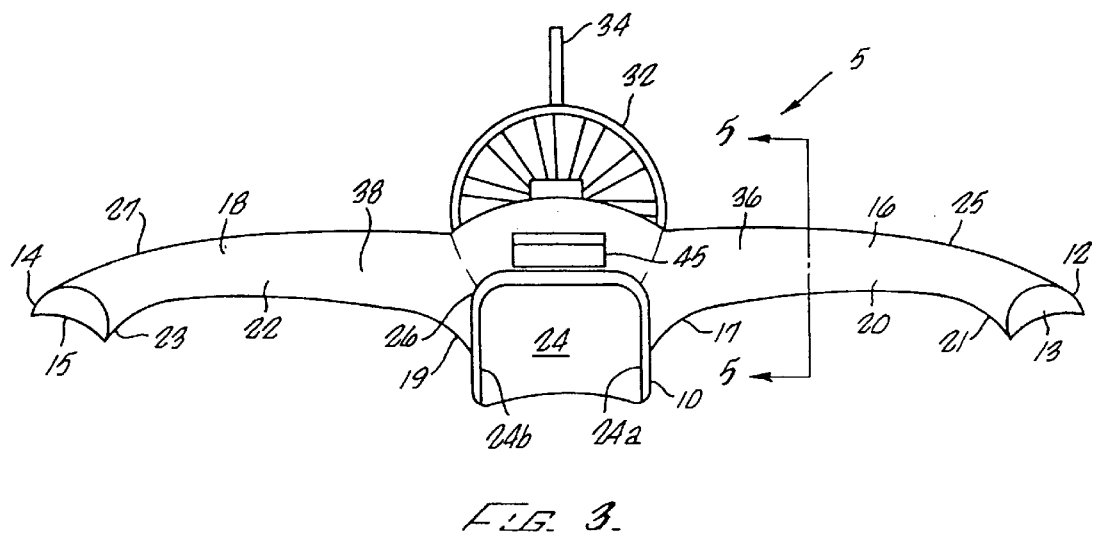
FIG. 3 is a front plan view of the watercraft of FIG. 1 showing the lateral configuration of the support structures for the sponsons.

An embodiment for a first preferred watercraft 5 is shown in FIGS. 1–3. The watercraft 5 comprises a central hull 10 forming a central portion of the craft. A pair of laterally disposed sponsons 12 and 14, respectively, are positioned in parallel relationship with the longitudinal axis of the hull and are mounted to the central hull 10 by outwardly directed support or wing structures 16 and 18, respectively. The sponsons 12 and 14 are preferably aligned rearwardly of the bow of the central hull 10. The watercraft design positions the pair of sponsons 12, 14 equidistantly and laterally from the watercraft central hull, and rearwardly from the bow. The wing structures 16, 18 have an aerodynamically configured shape to generate lift force to improve transitional and high speed performance of the watercraft. Preferably, the wing structures mounting the sponsons to the hull are configured to have the shape of an airfoil with a relatively large radius leading edge to improve low speed lift and stall characteristics. Also, the wing structures extend upwardly and outwardly from the central hull to define a dihedral angle with a horizontal plane of the craft to provide roll stability. The inside surface of each sponson provides a barrier which prevents lateral flow of air from under each of the respective wing structures to further reduce stall airspeed, and to permit efficient utilization of the forces generated beneath the wing structures from the force of airflow.

The wing structures 16 and 18 are identical in structure and configuration though of mirror image and will be described simultaneously with this understanding. The wing structures 16, 18 mounting their respective sponson 12, 14 extend from the side of the central hull 10 laterally to the sponson. The wing structures 16, 18 have undersurfaces 20, 22, each of which is outwardly and upwardly directed to form a dihedral angle with a horizontal plane through the central hull 10 as it reaches out to its respective sponson 12, 14. Preferably the wing section 16, 18 is formed with a positive dihedral angle (for example about 3°). Each of the undersurfaces 20, 22 has a curved section 17, 19 to blend with the side surfaces of the central hull 10. At their outer ends, the undersurfaces 20, 22 have outwardly and downwardly curved sections 21, 23 each of which form a "dropping edge" bounding the undersurfaces 20, 22 of the wing section 16, 18 and blending into the interior side walls of each of the respective sponsons 12, 14. The upper side of each of the wing structures 16, 18 extends outwardly and curve downwardly to blend into each of the outer surfaces of the sponsons 12, 14 which they support. This wing structure design forms a smooth and continuous form for the upper and under surfaces which smoothly form into the supported sponsons 12, 14.

Each of the wing structures 16, 18 has an aerodynamically configured shape, i.e., has the shape of an airfoil. This aerodynamic shape may be clearly seen in the cross sectional view of FIG. 5 taken along line 5—5 of FIG. 3 through the wing structure 16 to show the curved upper surface 25 extending from the front to the rear of the wing section and the substantially flat undersurface 20, extending from the front to the rear of the wing section.

Referring again to FIGS. 1–3, the leading edge of each wing section 16 and 18 extends outwardly and rearwardly from the bow of the central hull 10 to the front of the rearwardly positioned sponsons 12, 14, respectively which they support. Each of the sponsons 12 and 14 is positioned parallel with the longitudinal axis of the central hull 10, beginning rearwardly of the bow of the central hull 10 and ending at a point substantially flush with the stern of the central hull 10. The leading edge of the wing section 16, 18 thus form a swept back wing configuration from the bow of the central hull 10. Preferably, the leading edges 36, 38 of the wing section 16, 18, respectively, extend rearwardly forming a 60° angle with the longitudinal axis of the central hull 10. The leading edges 36 and 38 have a relatively large radius frontal surface, such as is shown in the cross section depicted in FIG. 5 for leading edge 36. The trailing edges 40 and 42 of the wing structures 16 and 18, respectively, are generally narrow in width and extend perpendicularly to the rearward end of each sponson 12 and 14 to form a straight trailing edge.

In preferred form, the central hull 10 has a concavity 24 inwardly formed along the length of the hull's undersurface. The concavity 24 rises forwardly and upwardly into the lower portions of the bow of the central hull 10 to form a forwardly directed concave surface at the frontal portion of the bow bounded by edges 24a and 24b respectively.

Similarly, each of the sponsons 12, 14 has a concave shaped undersurface 13 and 15, respectively, formed along its length with a forwardly and upwardly curved portion to form a forwardly directed, concave frontal surface. Preferably, the concavities 13 and 15 formed into sponsons 12 and 14, respectively, are slightly inwardly directed and preferably symmetrical about a plane forming an angle between 20° and 30° with the vertical.

A cockpit 28 is formed in the upper surface of the central hull 10 and is positioned approximately ⅓ along the longitudinal length of the central hull from the bow to the rear. The cockpit 28 contains a seating position 30 for a pilot and also contains control elements, as for example steering handle 40. The upper surface of the bow of the central hull 10 is shown with an air inlet 45 formed to provide an airstream to radiator means 43 for cooling a power plant used to drive watercraft 5.

A ducted fan 32 is positioned rearwardly of the cockpit 28 to provide motive force for propelling the watercraft. A rudder 34 is positioned behind the outlet 65 of the ducted fan 32 to direct the airflow from the ducted fan to provide directional control for the watercraft. The ducted fan 32 has an inlet 59 behind the cockpit 28 to receive air which is then compressed by the rotating fan blade 62 to force compressed air at high speed out of the ducted fan outlet 65. Horizontal airflow control elements may also be provided.

Figure 4:
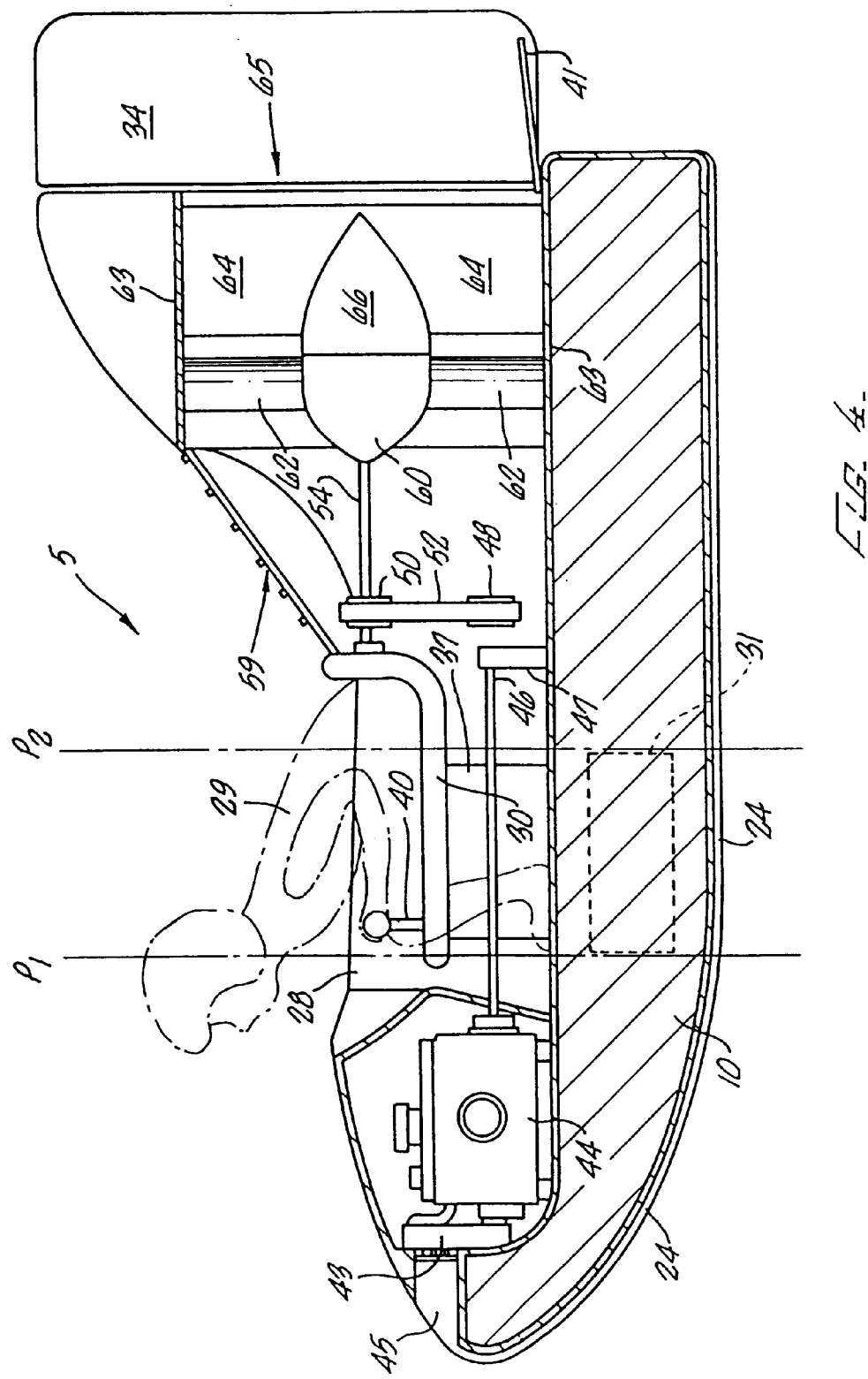
FIG. 4 is a section view through the longitudinal axis of the watercraft displaying the mass elements contained within the central hull in full view and a seating position for pilot with the pilot's body indicated with a broken line.

The mass distribution of the watercraft is designed so that the center of gravity of the craft lies within a longitudinal range along the longitudinal axis of the central hull 10, shown in FIG. 4 as bounded by front plane $P_1$ and rear plane $P_2$ extending perpendicularly with the longitudinal axis of the craft. The seating position 30 of the pilot within the cockpit 28 of the central hull 10 is positioned substantially between the planes $P_1$ and $P_2$ thus positioning the driver 29 substantially within the range of the center of gravity of the craft 5. Preferably, the position of the center of gravity is below the seating position 30 of the pilot 29 so that the pilot is seated over the center of gravity.

The mass elements mounted within central hull 10 are distributed within the hull to place the center of gravity within the defined longitudinal range between planes $P_1$ and $P_2$ and below the seating position of the pilot. The fuel tank 31 is positioned below the seating position 30 of the pilot 29 to provide fuel storage within the range of the center of gravity between planes $P_1$ and $P_2$ so that fuel usage will not substantially affect the balance of the craft. A power plant 44 is positioned forwardly of the cockpit 28 in the bow of the craft and lower than the seating position 30 of the pilot 29. The power plant 44 may be a typical multi-cylinder 2-cycle marine engine such as is commonly known by those in the art. The engine 44 may include a radiator 43 positioned adjacent the air inlet 45. The ducted fan 32 is positioned in the stern of the craft and is mounted to direct the thrust from the airflow which it generates over the surface of the water on which the craft is supported. The ducted fan 32 generally comprises a hub 60 which mounts a plurality of fan blades 62 radially around the hub 60. The fan blades 62 are bounded by a cylindrical wall or fan duct 63. A faring 66 extends rearwardly from the hub 60 to provide a smooth surface over which the airflow compressed by the fan blades 62 may pass. A torque control means to correct torque forces generated by thrust of the ducted fan 32 is provided, such as curved vanes 64 which slightly redirect the flow of air leaving the fan blades 62 as they are powered. The flow of air leaving the ducted fan passes by the rudder 34 for directional control.

Power from the power plant 44 is transmitted to rotate the ducted fan 32 through drive means comprising a first horizontally disposed shaft 46 extending below the seating position 30 of the driver. The shaft is mounted for rotation by suitable bearing support means such as the engine 44 and a bearing support 47. At the rearward end of the shaft 46 a pulley 48 is mounted to drive a fan shaft 54 through pulley 50 mounted on such shaft 54 with a belt 52 interconnecting the pulleys 48 and 50. The fan shaft 54 may support the ducted fan hub 60 and is mounted for rotation by suitable bearing support means (not shown). The power plant 44 the drive means comprising the shafts 46, 54 with the belt drive and the ducted fan 32 are all elements commonly known to those skilled in the art and can be selected from any one of a number of manufactures. The power plant 44, the drive means and the ducted fan 32 are mounted within the hull 10 such that in combination with the mass of the hull, their individual masses combine to position the center of gravity for the watercraft within the longitudinal range between the planes $P_1$ and $P_2$ so that the seating position of the driver 30 is positioned above the center of gravity.

Control means (not shown) may be provided for controlling the speed of the engine 44 and for controlling the rudder 34 such as through control handle 40 which communicates with the rudder 34 through a control linkage 41.

The watercraft, including the central hull 10, the wing section 16 and 18 and the sponsons 12 and 14, is preferably constructed in a one-piece structure from a structurally molded foam composition having a tough outer surface for durability. However, other materials which are sufficiently light while rigid may be used such as fiberglass or other plastics or laminations as would be selected by one skilled in the art of watercraft hull design.

In operation as the watercraft accelerates hydrodynamic forces exerted against the forward portion of the central hull and against the sponsons pitch the craft upwardly. This raises the swept back leading edge of the wing sections supporting the sponsons to enlarge the frontal window between the undersurface of the wing sections and the surface of the water, while lowering the trailing edge of the wing sections close to or on the surface of the water to substantially close the passage for air at the trailing edge of each wing section. This forms an air pocket below each wing section which receives the airstream as the watercraft urges ahead to generate ram and ground effect lift on the under surface of each wing section. The center of aerodynamic lift on the wing section is rearwardly positioned.

As the watercraft increases in speed and begins to plane on the surface of the water, the center of hydrodynamic lift moves rearwardly along the undersurface of the hull permitting the watercraft to decrease its upwardly pitched attitude and become more horizontally disposed. Aerodynamic lift at the rearward portions of the wing sections assist in decreasing the upward pitch of the craft. As the watercraft noses forward and the upward pitch decreases not only does the center of hydrodynamic lift move rearward on the undersurface of the hull but airflow is permitted over the wing sections as the trailing edge of each wing section lifts from the surface of the water. This generates aerodynamic lift force on the wing sections. The center of aerodynamic and/or ground effect forces generated on each of the wing sections move forwardly.

As the watercraft goes through transition and approaches operational speed the center of hydrodynamic and/or ground effect lift force on each of the wing sections converges longitudinally, i.e. the center of hydrodynamic force moves toward the rear of the craft and the center of aerodynamic and/or ground effect force moves toward the front of the craft, such that the summation of forces enters into the longitudinal range of the center of gravity of the craft. In other words viewing the longitudinal range of the center of gravity as bounded on a forward side by a first plane orthogonal along the longitudinal axis of the craft and bounded on the rearward side by a second plane orthogonal to said axis, the summed hydrodynamic and aerodynamic and/or ground effect forces will converge within the two bounding planes. Thus, when the watercraft is at speed not only is the center of gravity, which is the balance point of the craft, positioned within the defined longitudinal range, but the lift forces acting on the craft are also positioned within this range to provide the pilot attitude control of the watercraft by shifting his weight with respect thereto. Attitude control is thus assisted by a pilot shifting body position in the cockpit, or leaning in a desired direction. This control is possible because the longitudinal range bounding the center of gravity and lift forces is substantially within the seating position of the pilot in the craft and preferably with the fuel supply included so that the balance of forces is not substantially upset by fuel usage. The pilot may thus shift his weight forward to nose the craft downwardly and shift his weight aft to nose the craft upwardly. Additionally, since the center of gravity is positioned directly under the pilot, the pilot may lean to the left or right to rotate the craft to the left or right, respectively. The watercraft may thus be controlled by the pilot through usage of the control elements of the watercraft, especially the rudder and/or horizontal stabilizers, and through shifting of body weight as is easily accomplished within the cockpit when the craft is in operation.

FIGS. 6–11 illustrate an alternative embodiment of a watercraft 100 having a pontoonless single form body structure 110. The body structure 110 has left and right wing sections 140, 150 which merge together to form a continuous central hull section 120. The watercraft 100 is constructed such that its mass elements, which include the engine 160, drive train 174 and propulsion mechanism (shown as a ducted fan 180), are distributed to place the center of gravity (C/G) of the craft, without the presence of any pilot or riders, within the vehicle's elongated bench seating area 175. In a preferred configuration, the craft's center of gravity is located generally centrally beneath the seating position of the pilot 105.

The desired balance of the craft 100 (to control pitching moment) is achieved by locating the engine 160 forward of the elongated bench seating area 175, which is long enough to permit movement of the operator/operators forward and rearward. The desired balance may be enhanced by locating the ducted fan 180 rearward of the elongated seating area 175. The craft 100 may be constructed with an inherent stability which permits the pilot 105 to alter the pitch of the craft by moving body position forward or rearward. The pilot 105 straddles the seating area 175 with the pilot's feet being permitted to comfortably rest on the bottom of the craft 100. The pilot steers the craft 100 by leaning to one side or the other in addition to turning the steering bars 171 which operate the rear rudder 198. Though details of the connection are not shown, the steering bars 171 are operably connected to the rudder by a suitable drive mechanism such as steering cables.

The engine 160 may comprise a typical internal combustion marine engine, but other power plants designs may be employed. For improved airflow and cooling, the radiator 165 for the engine 160 may be located to the rear of the craft 100.

To prevent fuel consumption from substantially disturbing mass distribution, the craft 100 includes means for minimizing disturbance of mass distribution due to fuel consumption by positioning the fuel storage tank 177 beneath the seating position 175. Therefore, as the fuel in the tank 177 is consumed, the weight of fuel remains balanced about the C/G.

The output of the engine 160 is transmitted through a transmission 172 (which alternately may comprise a clutch or torque converter) and then transmitted via the drive train 174 to the ducted fan 180. The thrustline TL is such that its output acts in a straight line to the center of gravity such that no pitch moments (or a minimum amount of pitch moment) is applied to the craft due to the thrust applied by the ducted fan 180. Moreover, the thrust line $T_L$ is parallel to the hydrodynamic surface, i.e., the flat bottom surface of the craft. The drive train 174 passes beneath the seating area 175 and is actually straddled by the legs of the pilot 105 (as well as by any passenger). The ducted fan 180 is protected from water damage by its dry location.

Figure 10:
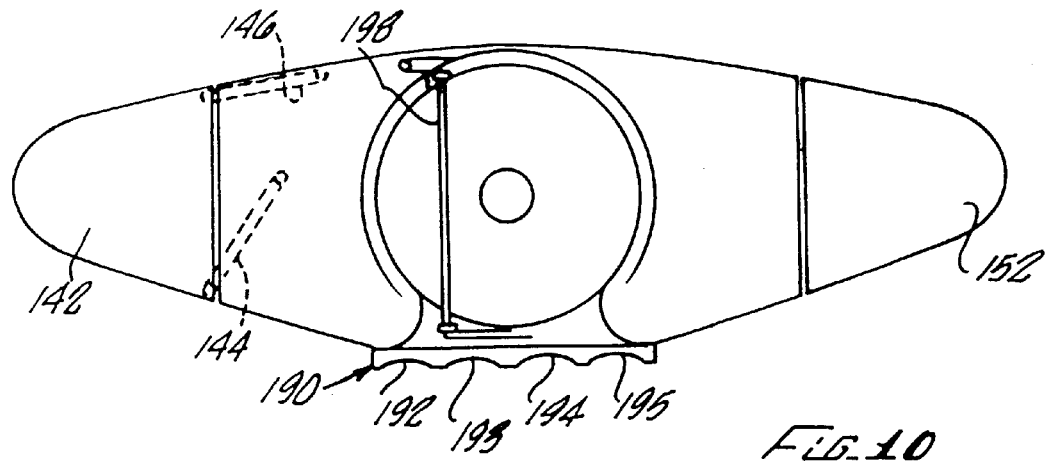
FIG. 10 is rear elevation view of the watercraft of FIG. 6.
Figure 11:
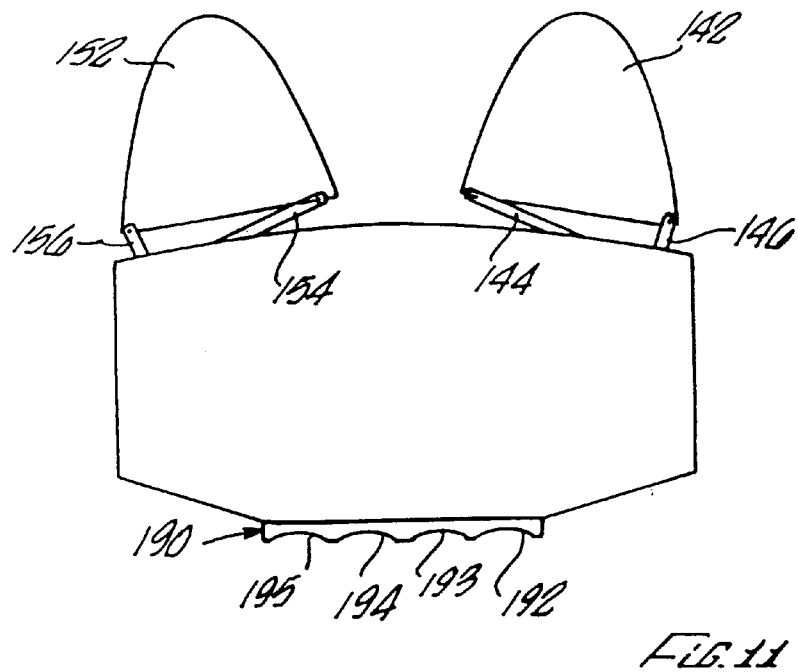
FIG. 11 is a front elevation view of the watercraft as in FIG. 10 with the winglets in a retracted position.

FIGS. 10–11 illustrate the craft 100 constructed with collapsible wing sections 142, 152. The wing sections 142, 152 are generally fixed in place to the central hull portion 120. Upon release, the left wing section 142 may be pivoted above the central hull section 120, the left wing section 142 being mounted to pivotable support arms 144, 146. Similarly, the right wing section 152 may be pivoted above the central hull section 120, it being mounted to pivotable support arms 154, 156. In this collapsed condition, the craft 100 may be more readily transported (because of its reduced width such as by trailer) or stored.

The craft 100 possesses a unique wing shape. As described above, the craft 100 has wing sections 140, 150 which blend together with the central hull section 120 to form a single, continuous flying body structure 110. The entire body structure 110 (i.e. the wing sections 140, 150 and central hull section 120) is wing-shaped and provides lift for the craft. Such a design is unlike other crafts such as flying boats or seaplanes with pontoons in which the central hull provides essentially no lift.

Details of the wing shape are illustrated in FIGS. 7–8. FIG. 7 has cross-section lines A—A through F—F which refer to corresponding lines A through F in FIG. 8, illustrating the cross-sectional wing shape at the particular cross-sectional location. As shown in the figures, the leading edge of the body structure is extremely thick with a substantially horizontal, flat hydrodynamic bottom (the planing surface) and a substantially built-in angle of attack relative to the flat bottom planing surface. The wing shape has a maximum % thickness (ratio of wing thickness to chord length) on the order of 30% which is about twice (or more) that of typical wing designs. As shown in the cross-section lines A through F in FIG. 8, the maximum % thickness remains approximately constant throughout the wing span of the craft 100. The thick wing enables the thrust forces to act directly on the center of gravity as well as enabling the thrust forces to act parallel to the planing surface. This thick wing design may also be useful for conventional aviation.

The bottom surface is flat to accommodate aquatic planing. In addition, the bottom surface is equipped with hydrodynamic stabilizers 190 comprising a series of longitudinal concavities 192, 193, 194, 195 positioned on the underside of the central hull section 120. It is intended that these concavities 192–195 provide lateral hydrodynamic stability and increased lift. The concavities 192–195 are preferably longitudinally aligned and provide lateral resistance when turning during water operation, otherwise the craft would tend to continue to move along a straight line in a crabbing manner when the pilot desires to execute a turn. The stabilizers 190 are formed with a step 191 such that the forward portion of the bottom surface of the craft 100 is lower than the rear surface.

The present inventor has determined that the preferred planform (as viewed from a simplified top plan view) for directional stability of a craft requiring no vertical stabilizers was a half-circle leading edge (with the radius at the C/G) with a rectangle with its width sharing the diameter of the half circle with an area three times that of the half circle and the center of lift C/L located at 25% of the symmetrical cross sectional area. Such a craft has a relatively low aspect ratio (AR=wingspan/average chord length) which for the above configuration is on the order of 0.6 as compared to other craft having aspect ratios of several times higher. The preferred aspect ratio is less than 1.0. Fins may be required for a narrower swept planform such as one for a craft as shown in FIGS. 6–9 or FIGS. 21–24 which is trailerable [maximum 8 ft (2.5 m) in width]. In a large freighter application such as illustrated in FIG. 27, a greatly reduced or finless design without empennage or sponsons may be practicable.

This planform enables the center of gravity and the center of lift to be readily placed in the same location. Moreover, this configuration is preferred because it has a configuration with a narrow lateral dimension and a long longitudinal dimension (i.e., low aspect ratio) resulting in greater safety in operation. A vehicle having a higher aspect ratio or with sponson at forward and lateral locations is more susceptible to undesirable impacts with waves. That is, if one wing side impacts a wave while the other does not, a cartwheel effect may be introduced. The longer length craft is also more apt to bridge the gap between successive waves and with its low aspect ratio, it is less likely that the wing portion on one side of the craft may stall and impact a wave without the wing portion on the other side also impacting.

Unlike conventional watercraft, the craft 100 is aerodynamic and, at speed uses ground effect to ride above the water surface. Even if a wave is occasionally impacted, the craft will still remain primarily supported by air in flight, thereby minimizing the severity of any water impact resulting in a "soft ride" for the vehicle. The softness increases with speed by which the craft gains altitude over the waves. This soft ride is not experienced by conventional watercraft, flying boats, and sea planes.

Another alternative embodiment of a preferred wing design will now be described. To assist in describing the preferred wing shapes, certain terminology will be defined. The chordline of a wing is defined as a straight line drawn from the leading edge to the trailing edge of the wing. It is possible that the chordline may pass outside of the wing surface. The meanline of the wing is defined as a line connecting all of the points midway between the upper wing surface and the lower wing surface. The meanline is also referred to as the midline or the mean camber line. Being between the upper and lower wing surfaces, the meanline cannot pass outside the wing surface. The perpendicular distance between the chordline and the meanline is called camber, with maximum camber being the camber at which this distance is greatest. The thickness of a wing is the distance between the upper surface and the lower surface. Chord length is the length of the chordline.

FIG. 12 is a cross section of a thick wing 210 (its maximum thickness being about 23% of chord length) with a chordline 212 extending from the leading edge 214 to the trailing edge 216. Following more conventional wing shape theory, the wing 210 has a configuration with more wing area above the chordline 212 than below. FIG. 13 illustrates the same wing shape 210 with a meanline 218 drawn. As shown in the figure, the meanline is convex in shape, curving downward as the meanline approaches the leading edge 214 of the wing 210. The wing 210 tends to follow the curve in flight and thus is unstable while possessing good lift/drag characteristics. Aircraft with this wing shape require stabilizers such as a tail unit to overcome the pitch down moment as the wing tends to follow the curve of the meanline 218.

FIG. 14 is a cross section of a preferred wing design 220 with a meanline 222 drawn from the leading side 224 to the rear 226. The wing 220 is of a thick design (with a maximum thickness on the order of 30% of chord length) and has a flat horizontal bottom surface 225 during normal operation (attitude). In contrast to the conventional meanline shape of the wing 210 of FIG. 13, the wing 220 of FIG. 14 has a concave-shaped (upwardly curved) meanline 222. This upwardly curved meanline shall be referred to as a reverse or inverted curve of the meanline. In a preferred configuration, the meanline 222 is (a) straight over the rear portion of the wing 220 (e.g., over the rear 70% of the wing) and (b) slightly upwardly curved over the remainder (forward) portion of the wing 220. Alternately, the meanline 222 is upwardly curved from the C/L forward with the meanline generally straight for the wing portion behind the C/L.

The leading edge 224 of the wing 220 is rounded having a very large radius R as shown in FIGS. 15–16. Generally speaking, the larger the radius, the more gentle the stall characteristics. In a preferred wing shape with a maximum thickness on the order of 30% of chord length, the nose radius R may be on the order of 6% to 10% of chord length.

With its inverted meanline configuration and large nose radius R, the wing 220 of FIG. 15 has been observed to create a mass of stagnated air preceding the leading edge 224 of the wing 220. It is postulated that the wing 220 assumes an "effective" meanline 223 (an effective aerodynamic center) which shifts from straight to downwardly curved thereby assuming a shape and an angle of attack possessing good lift characteristics. Moreover, the wing shape has pitch moments which are self-correcting or stable without requiring an elevator. As the nose dips down, as shown in FIG. 16 the air flow starts to conform to the shape-of the meanline raising the nose as the upward curve is followed. The center of pressure C/P is shifted forward creating corrective moments to return the craft to stable centering position. As the nose turns upward from the normal attitude, the effective meanline 223 transitions to being downwardly curved thereby increasing effective camber, and air pressure acting on the underside of the rear section behind the center of lift C/L increases (as the section's exposure to air flow is increased) creating normal pitch down corrective moments to return the craft to the stable center position.

A conventional wing having a convex curved meanline 218 and small radius leading edge as shown in FIG. 17 does not exhibit such stability. Such a wing only has normal pitch down moments and when forced to an increased angle of attack, with its small radius leading edge, the air is divided by the airfoil and air flow stagnation occurs under the wing at much lower angles of attack. The shift (of the stagnation point) does occur and stagnation builds under the wing such that the air flows forwardly and vertically over the leading edge causing the stall since the air flow cannot conform to the wing surface. In contrast with a large radius leading edge as in FIG. 15, the aerodynamic center of the air flowing to the leading edge shifts relative to the chordline as the angle of the relative wind shifts. This airfoil has "effective camber" achieving stability and equilibrium at various speeds in or out of ground effect and which has good lift characteristics.

The wing 220 is particularly useful at relatively low speeds [on the order of 25–60 mph (35–90 kph)] or as a ground effect craft, but such a configuration may also be suitable or readily modifiable for general aviation.

Figure 18:
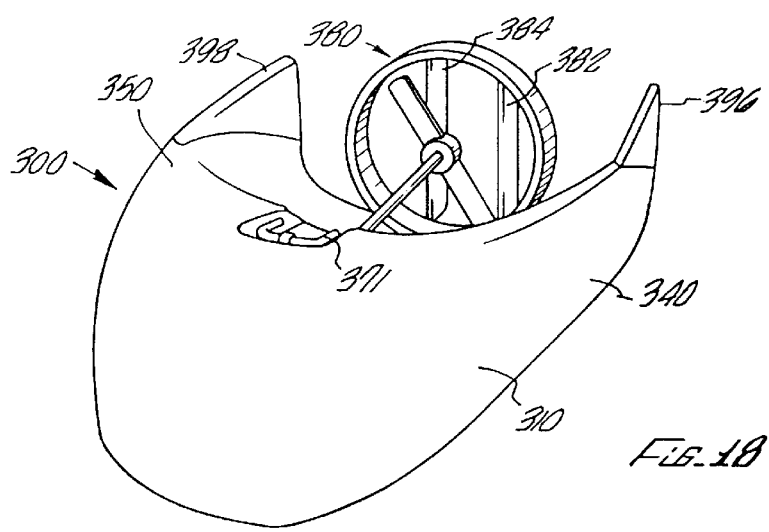
FIG. 18 is a top left side perspective view of another alternate watercraft embodiment according to the present invention.

The preferred wing design may be incorporated into a variety of flying craft designs. FIGS. 18–24 illustrate watercraft 300 which embodies this preferred wing design. FIG. 18 is a perspective view of the watercraft 300 which is a single seat or dual seat ground effects vehicle. The watercraft 300 has a single form body structure 310 with left and right wing sections 340, 350 which blend or merge together to form a continuous central hull section 320. Essentially the craft body structure 310 comprises a flying wing structure having the very thick wing cross section on the order of 30% (maximum wing thickness to chord length ratio) as described above.

Figure 20:
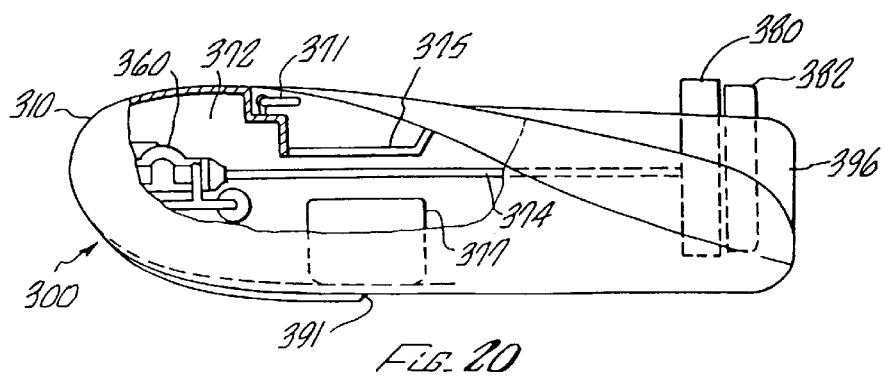
FIG. 20 is a side view in partial cross section of an the watercraft of FIG. 18.

As best shown in FIG. 20, the watercraft 300 is constructed such that its mass elements, which include the engine 360 and drive train 374 and propulsion mechanism (shown as a ducted fan 380 which is comprised of the outer duct 381 and rotating fan 379), are distributed to place the center of gravity C/G of the craft, without the presence of any pilot or riders, within the vehicle seating area 375. In a preferred configuration, the craft's center of gravity is located generally centrally beneath the seating position of the pilot. The center of lift C/L is also preferably positioned in the same location as C/G.

The desired balance of the craft 300 (to control pitching moment) is achieved by locating the engine forward of the seating position 375 and locating the radiator 361 and the ducted fan 380 in the rear. The craft 300 may be constructed with an inherent stability which permits the pilot to alter the pitch of the craft by moving body position forward or rearward. The weight shift acts against the corrective moments—i.e. increases/decreases air speed trimmed for a given angle of attack. The pilot straddles the seating area 375 with the pilot's feet being permitted to rest on the bottom of the craft 300. The pilot may steer the craft 300 by leaning to one side or the other in addition to turning the steering bars 371 which operate the rear dual rudders 382 and 384 aft of the ducted fan 380. Though the details of the connection are not shown in this figure, a steering bars 371 may be operably connected to the rudders 382, 384 by a suitable drive mechanism such as steering cables. Operation of the rudders 382, 384 steer on the water and induce yaw in the air causing banking turns as the forward end rises due to increased lift.

Also as in the previous embodiment, fuel consumption is prevented from disturbing mass distribution, by positioning the fuel storage tank 377 beneath the seating position 375. Therefore, as the fuel in the tank 377 is consumed, the weight of fuel remains balanced about the C/G so as maintain balanced mass distribution about the C/G even as the fuel is consumed.

Figure 21:
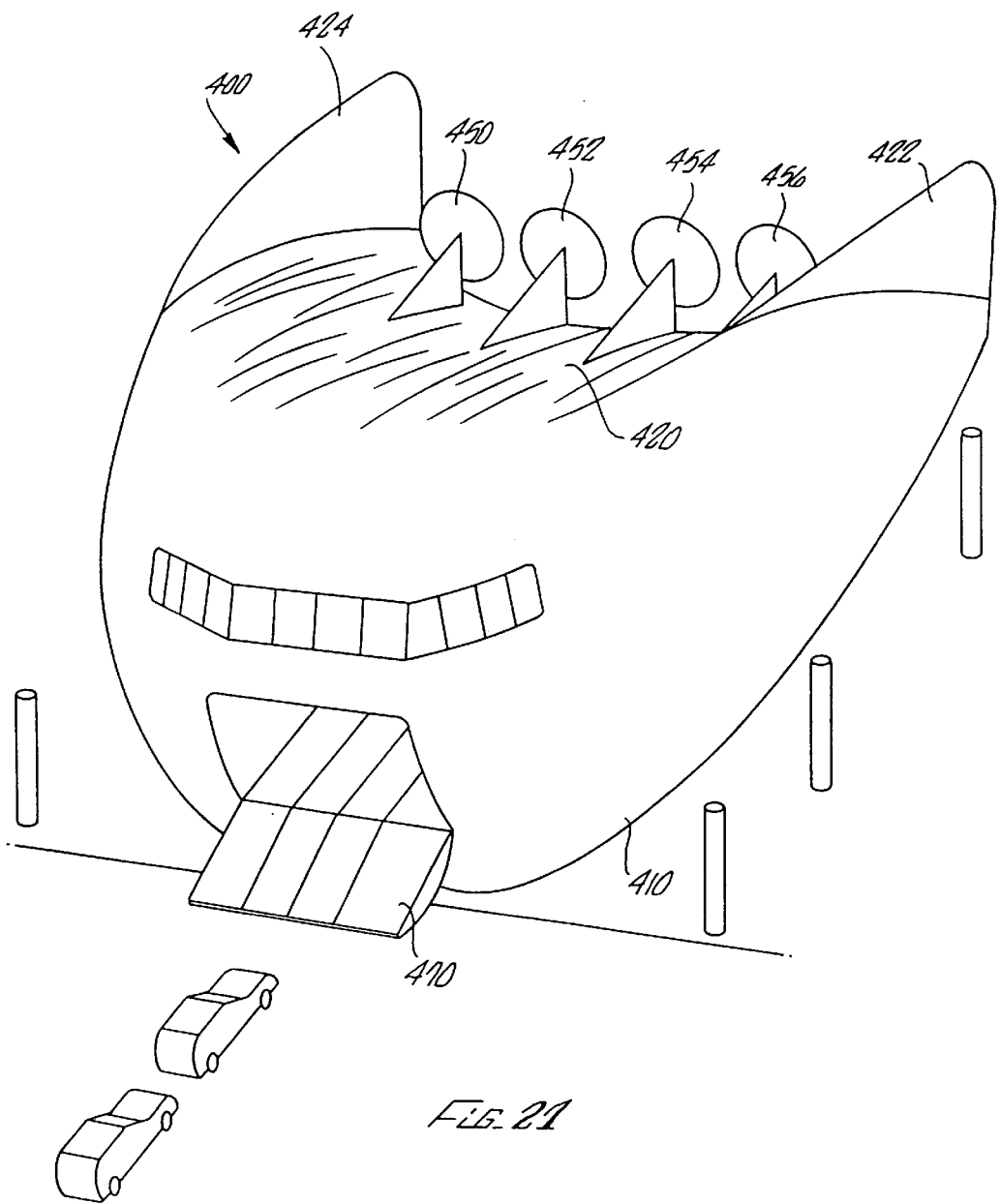
FIG. 21 is a top plan view of the watercraft of FIG. 18.

Details of the wing shape are illustrated in FIGS. 21–22. FIG. 21 has cross-section lines H—H through L—L which refer to corresponding lines H through L in FIG. 22 illustrating the wing shape at the particular cross-sectional location. As in the previous embodiment, these figures are drawn to scale to more fully describe the details of the wing shape of the watercraft 300. As shown in the figures, the leading edge of the body structure is extremely thick with a substantially horizontal, flat bottom. The wing shape has a maximum thickness (ratio of wing thickness to chord length) on the order of 30% which is about twice (or more) that of typical wing designs. The thicker wing generally works better at low air speeds and the built-in angle of attack relative to the hydrodynamic bottom actually reduces the effective thickness (as to drag). The thick wing also enables the thrust forces to act directly on the center of gravity and parallel to the hydrodynamic bottom.

The bottom surface is flat to accommodate aquatic planing. In addition, the bottom surface is equipped with hydrodynamic stabilizers 390 comprising a series of concavities 392, 393, 394, 395 positioned on the underside of the central hull section 320. It is intended that these concavities 392–395 provide both hydrodynamic stability and increased lift. The concavities 392–395 provide a pivot to turn on during water operation, otherwise the craft would tend to continue to move along a straight line in a crabbing manner. At flying speed, crabbing in the air induces a bank. The more forward side increases lift, the resultant banking in air as well as on the surface is favorable to good turning characteristics as banking induces the turn.

The bottom surface of the craft 300 is equipped with a step 391 (as shown in FIGS. 20 and 22) such that the forward portion of the craft bottom extends further downward than the rearward portion. The hydrodynamic bottom portion of the craft 300 is the portion forward of the step 391. The craft bottom to the rear of the step 391 provides for level flotation when the craft 300 is at rest.

The craft 300 is constructed with a generally flat, horizontal bottom planing surface. The bottom may have an upwardly curved forward surface. The center of pressure and balance point C/P should be approximately ¼ forward of the aft end of the hydrodynamic portion which is contrary to a symmetrical wing section where the center of lift would be at the ¼ chord position from the leading edge. The craft 300 is preferably designed to bring the center of pressure C/p and center of gravity C/G (within allowable variations) to a single point to achieve stability, and when the centers are displaced, to provide corrective moments to return to the stable operating position.

Figure 19:
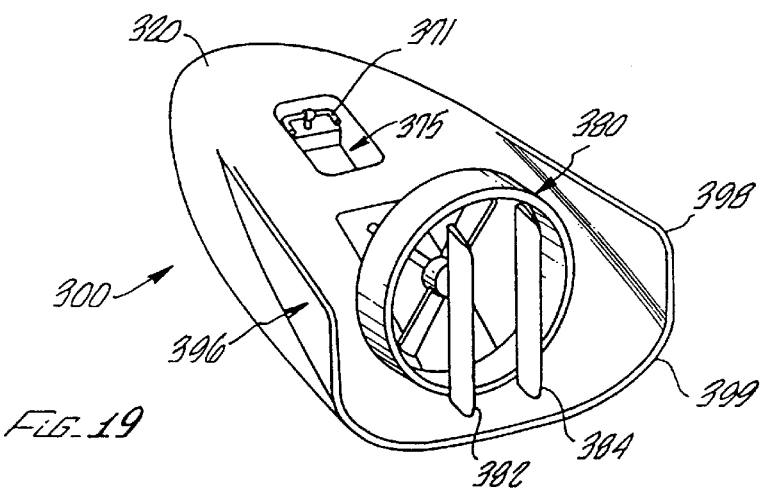
FIG. 19 is a rear left side perspective view of the watercraft of FIG. 18.

The rear of the craft 300 is constructed to form an expanded U-shaped rear section 399 as best viewed in FIGS. 18, 19 and 24 and is preferably equipped with vertical stabilizers or fins 396, 398 for added directional stability in the narrower planforms.

For a typical symmetrical airfoil, the center of lift C/L is located at 25% of wing area from the leading edge of the airfoil. In the craft 300, the U-shaped rear section 390 radically shifts the C/L rearward to 32.4% of the wing area (or 41% of the chord length from the leading edge). This rearward shift of the C/L permits the C/G of the craft (and therefore the seating position of the pilot) to be located at or near the center of the vehicle, even if a very lightweight engine 360 is employed.

A preferred craft may be designed by forming the general overall configuration including the reverse camber, U-shaped rear cross section and an empirically found C/L. Following the ¼, ¾ distribution around the C/L described above, the bottom surface is configured. The meanline with its upward curvature and positive angle of attack to the flat bottom surface is drawn. The leading edge radius is then drawn with its center on the meanline and the top surface is projected equidistant from the meanline. The craft mechanical components are then arranged so that C/G, C/L and C/P coincide.

For a single or two person vehicle, the overall dimensions for a sport version craft may be as follows:

length: 16.0 ft (4.88 m)
span: 8.0 ft (2.44 m)
height: 4.75 ft (1.45 m).

Such a vehicle may have a principal hull structure with an aspect ratio on the order of 0.5 as previously described with its wing/body shape having a wing thickness to chord length ratio on the order of 30%. The left and right wing sections merge with the central hull to form a continuous wing shape 310 constituting an aerodynamic shape which may provide lift over the entire craft surface and not just the wings as in conventional craft.

Other modifications to the design, including the addition of conventional control surfaces including a tail unit, fins, rudders (such as on the rear of the vertical stabilizers 396, 398), winglets, ailerons, spoilers, or edge flaps are possible. Nonetheless, a preferred configuration as shown in FIGS. 18–24 has no pontoons, ailerons, or sponsons or the like but only a single form wing/body structure.

In its preferred construction, the craft 300 is neutral balanced for a stable flight attitude inherent in the structure. The craft wing structure is by design trimmed for an air speed at a given weight. Adding power (thrust) increases the airflow over the craft wing structure increasing lift and the vehicle climbs; reducing power similarly decreases lift and the vehicle descends. The rate of climb or descent depends on power. The second control besides power is the rudders 382, 384 which provide for turning and/or banking.

When the craft 300 is operating in the air, if the weight (i.e., by movement of the pilot) is shifted forward, the nose 310 is pitched downward and meets aerodynamic forces which pitch the craft 300 back up. These forces can be balanced against each other with a new attitude, reducing the angle of attack. The craft 300 thus becomes balanced or trimmed for a new higher air speed at the given weight to maintain straight and level flight.

Similarly, if the weight is shifted rearward, the nose 310 rises, increasing aerodynamic lift and the craft may then be balanced and trimmed at a new, increased angle of attack and for a slower air speed.

In a sport, lightweight version, the watercraft 300 is capable of flying in proximity of the water surface with inherent stability and safety. Maneuverability is accomplished by one up/down controller (i.e., power/throttle) and one right/left controller (i.e., rudders). The result is a simple and safe craft with its built-in stabilities.

Figure 25:
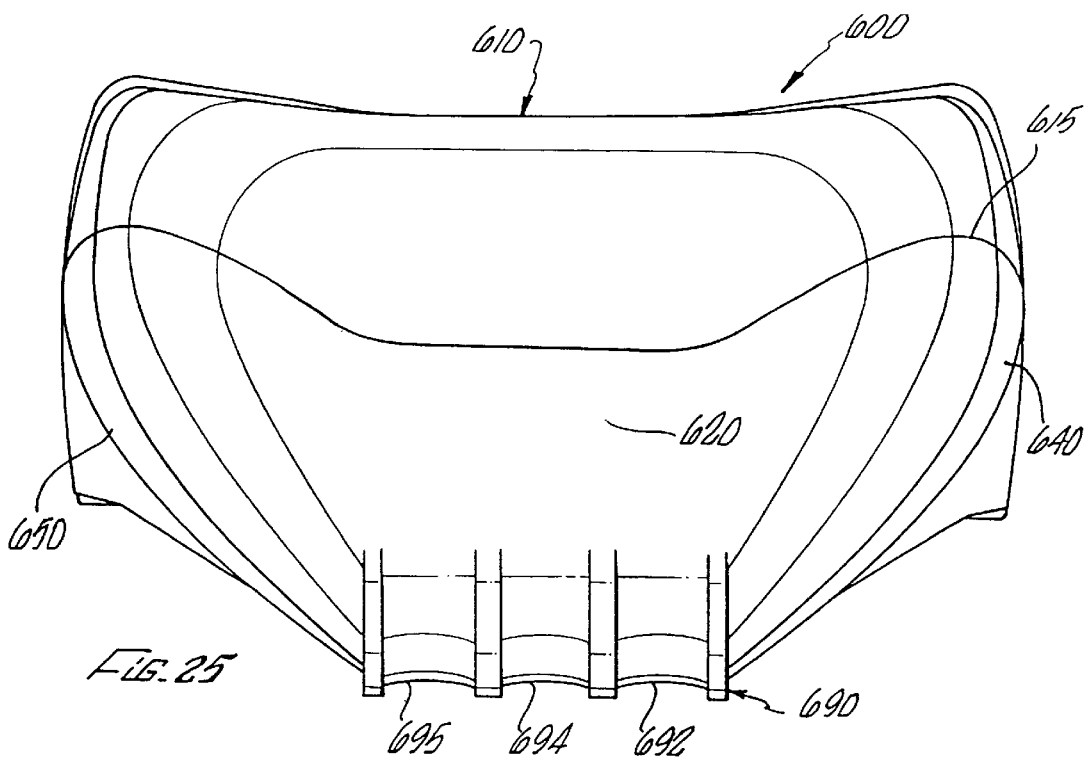
FIG. 25 is a front elevation view of the alternate watercraft.
Figure 26:
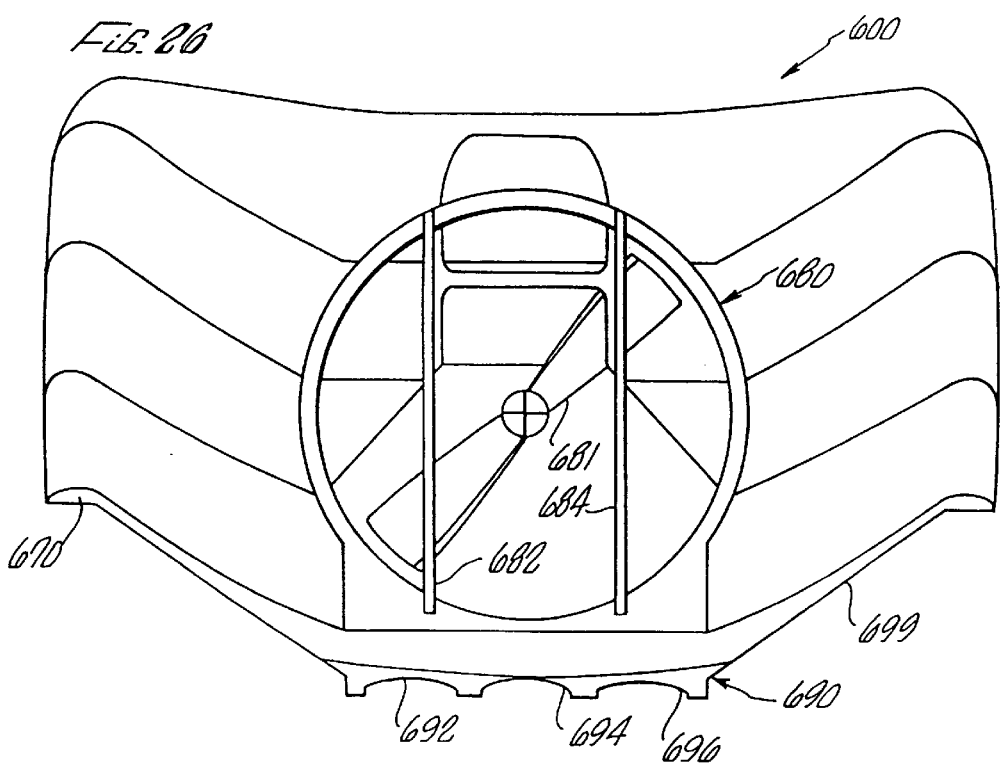
FIG. 26 is a rear elevation view of the watercraft of FIG. 25.

The craft may be adapted to particular customized configurations. One relatively minor reconfiguration is the craft 600 illustrated in FIGS. 25–26, FIG. 25 showing a front view and FIG. 26 showing a rear view. Unlike the previous embodiment of watercraft 300 which includes lateral fins 396, 398, the craft 600 is shown as a finless design, but fins may be added depending on the desired flight characteristics. The craft 600 has a single form body structure 610 with left and right wing sections 640, 650 which blend or merge together to form a continuous central hull section 620 to comprise a flying wing structure. The rear of the craft 600 is still constructed to form a generally expanded U-shaped rear section 699, but appears less pronounced due to the absence of fins.

The wing shape of the craft 600 is similar to that of the previous embodiment, however the nose section 620 of the body structure 610 is extremely thick with a substantially horizontal, flat bottom. FIG. 25 shows a parting line 615 along the nose section 620. The craft 600 includes a hydrodynamic bottom surface which is flat to accommodate aquatic planing. In addition, the bottom surface is equipped with hydrodynamic stabilizers 690 comprising a series of concavities 692, 694, 695 positioned on the underside of the central hull. It is noted that the watercraft 600 has only three concavities which are deeper as compared to the four shallower concavities 392–395 of the previous embodiment. As compared to the previous embodiment, the craft 600 also has a slightly thicker nose section 620 and a slightly greater angle of attack.

The craft 600 is driven by a ducted fan assembly 680 and steered in part by dual rudders 682 and 684 located behind the fan blade 680. The remaining details of the craft 600 are similar to the previous embodiment and need not be repeated.

FIG. 27 illustrates a craft 400 according to the embodiments of FIGS. 18–26 only on an enlarged scale. The craft 400 is envisioned as a commercial-size transport vehicle powered by a plurality of fans 450, 452, 454, 456 (which may alternately be ducted) located in the U-shaped rear section 420 of the craft 400. Left and right vertical stabilizers 422, 424 provide additional directional stability for the craft.

Figure 28:
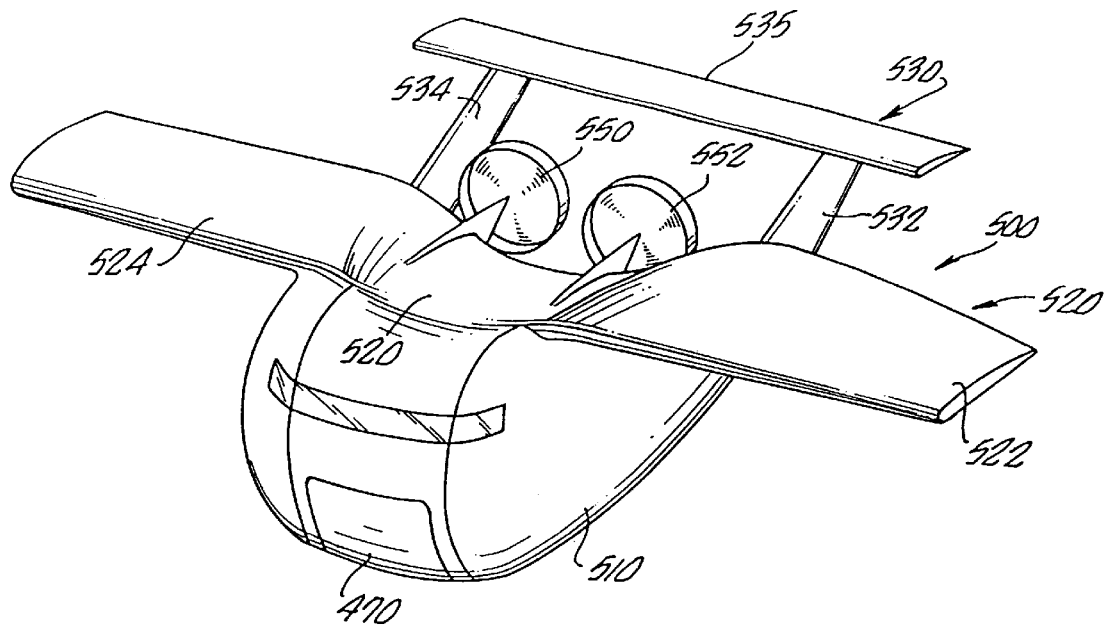
FIG. 28 is a top left side perspective view of a craft incorporating the preferred wing design and body shape of the embodiments of FIGS. 18–26 and including a separate wing and tail assembly.
Figure 29:
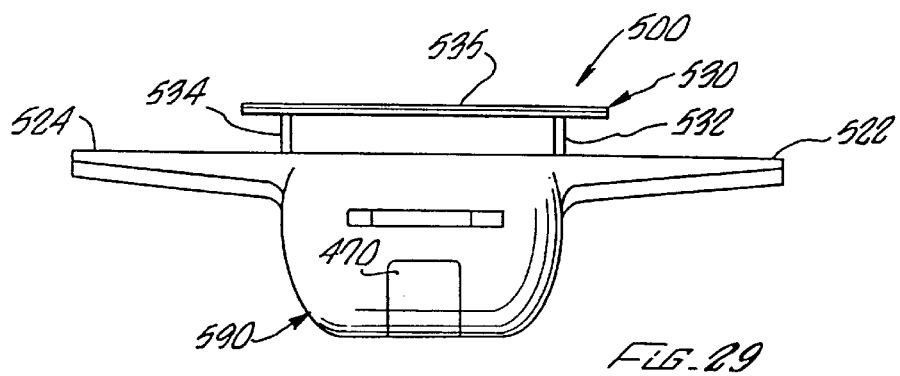
FIG. 29 is a front elevation view of the craft of FIG. 28.
Figure 30:
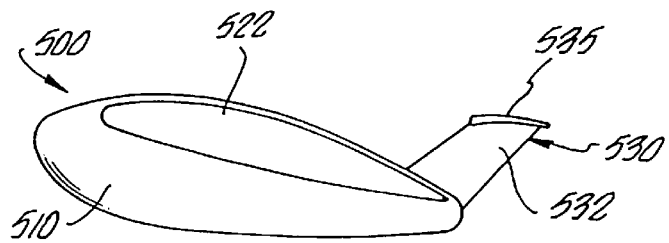
FIG. 30 is a left side elevation view of the craft of FIG. 28.

FIGS. 28–30 illustrate another embodiment of a craft 500 with a main body/wing section 510 and further includes an upper wing 520 having left and right wing sections 522, 524. The craft 500 is powered by two fan units 550, 552 located in the U-shaped rear section 520 of the craft 500. As shown in FIG. 30, the wing/body section 510 has the flat bottom surface and cross-sectional wing shape as described above with respect to FIG. 22 for example. The wing sections 522, 524 may also comprise thick wing sections of configuration similar to the central wing/body section, but may alternately comprise conventional wing cross sectional shapes.

The craft 500 may also include a tail section 530 comprising left and right vertical stabilizers 532, 534 to provide additional directional stability and a horizontal stabilizer 535 to provide additional vehicle pitch control. The craft 500 preferably includes a flat bottom surface to accommodate aquatic planing. The bottom surface is equipped with hydrodynamic stabilizers (as in the craft 300 of the previous embodiment) comprising a series of concavities positioned on the underside of the central hull section 520. It is believed that these concavities provide hydrodynamic stability and a pivot point on which to turn during water operation. The concavities are designed to reduce crabbing when the pilot attempts to turn the craft.

Figure 31:
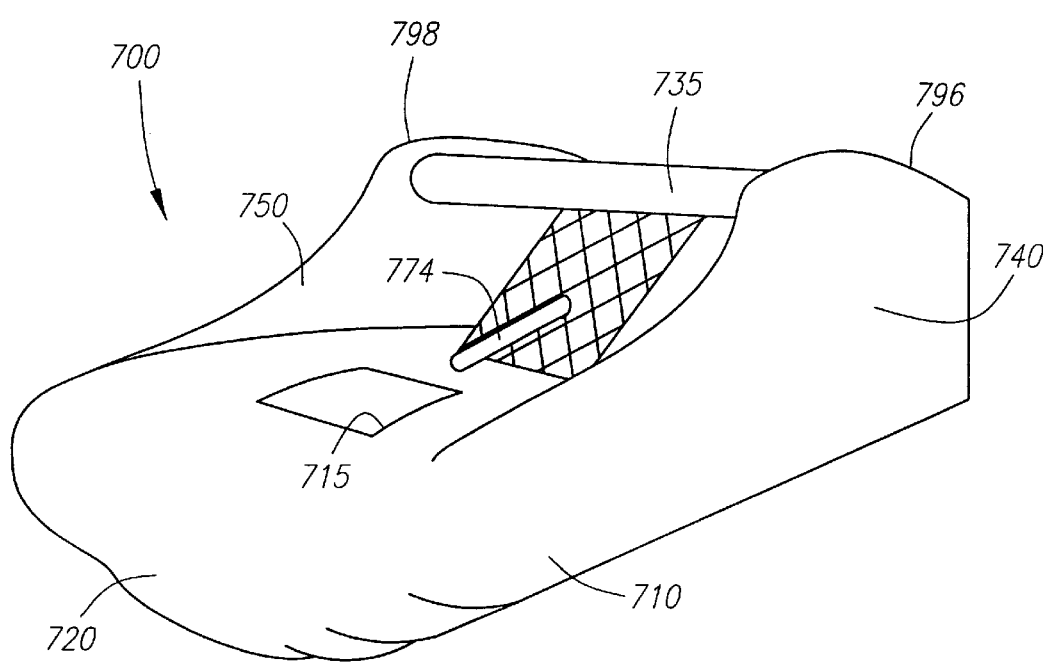
FIGS. 31–32 are top left side perspective views of another embodiment for a craft.
Figure 32:
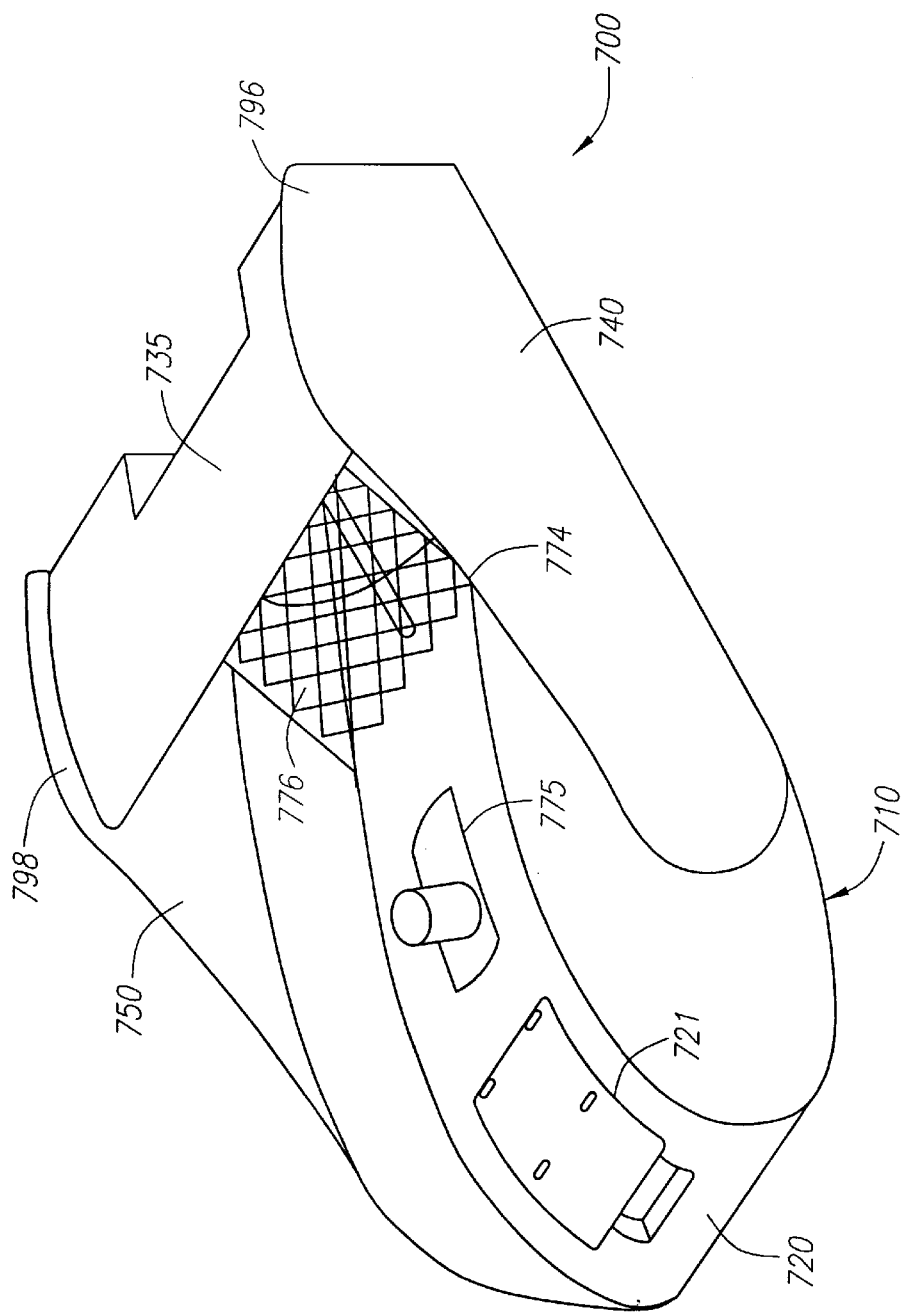

FIGS. 31–41 illustrate another watercraft 700 which embodies a preferred dual-wing design. FIGS. 31–32 are perspective views of the watercraft 700 which is a single seat or dual seat ground effects vehicle. The watercraft 700 has a single form body structure 710 with left and right main wing sections 740, 750 which blend or merge together to form a continuous central hull section 720. Essentially the craft body structure 710 comprises a flying wing structure having the very thick wing cross section on the order of 25–30% (maximum wing thickness to chord length ratio), or preferably 27% , as described above.

Figure 33:
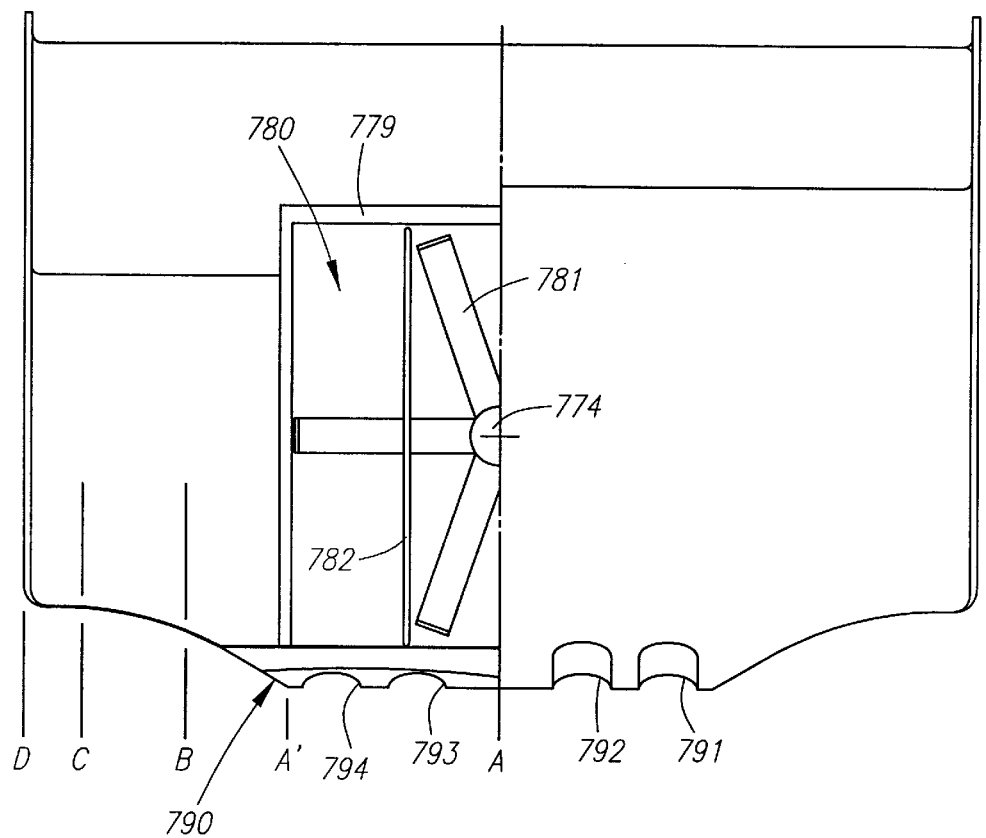
FIG. 33 is partially bisected front and back elevation views of the craft of FIG. 31.
Figure 36:
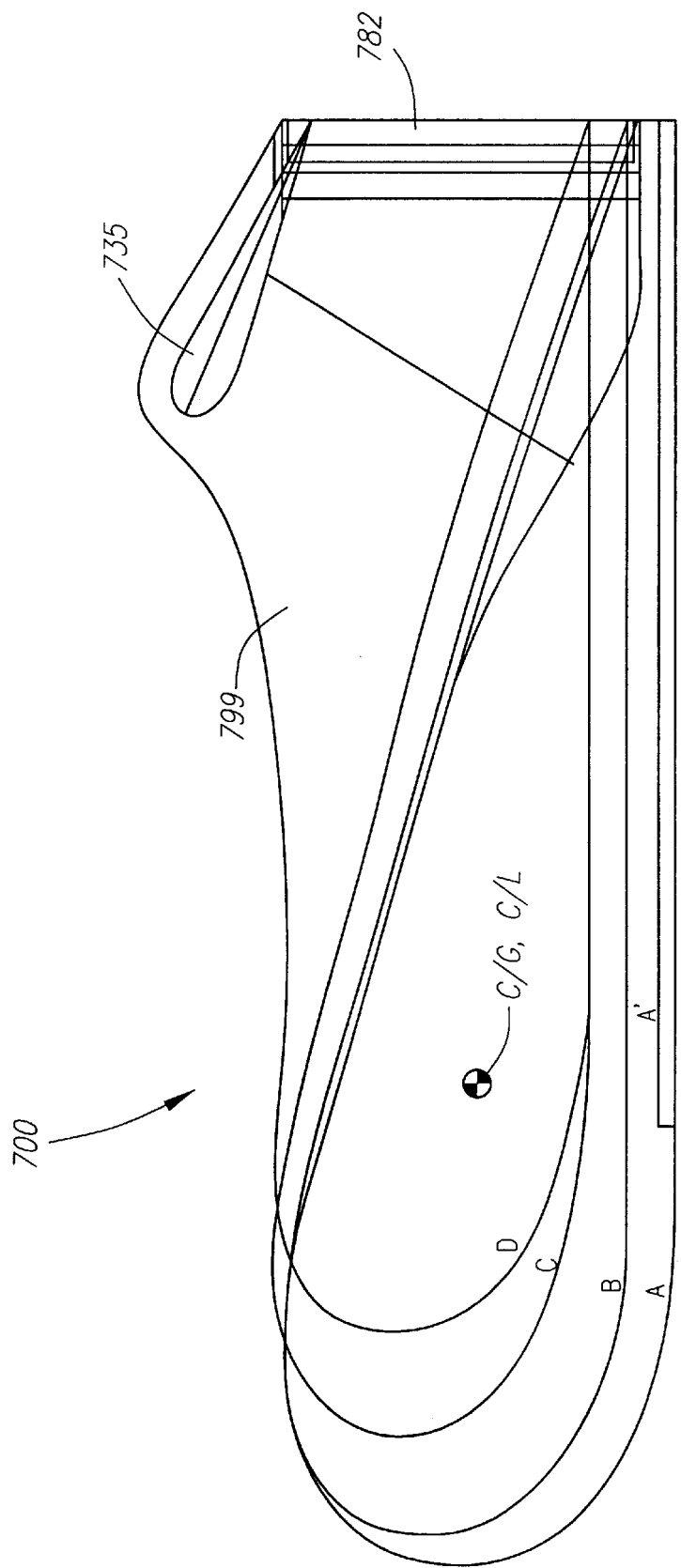
FIG. 36 is a schematic side view of the craft of FIG. 31 illustrating the wing shapes at positions A through D of FIG. 33–34.
Figure 37:
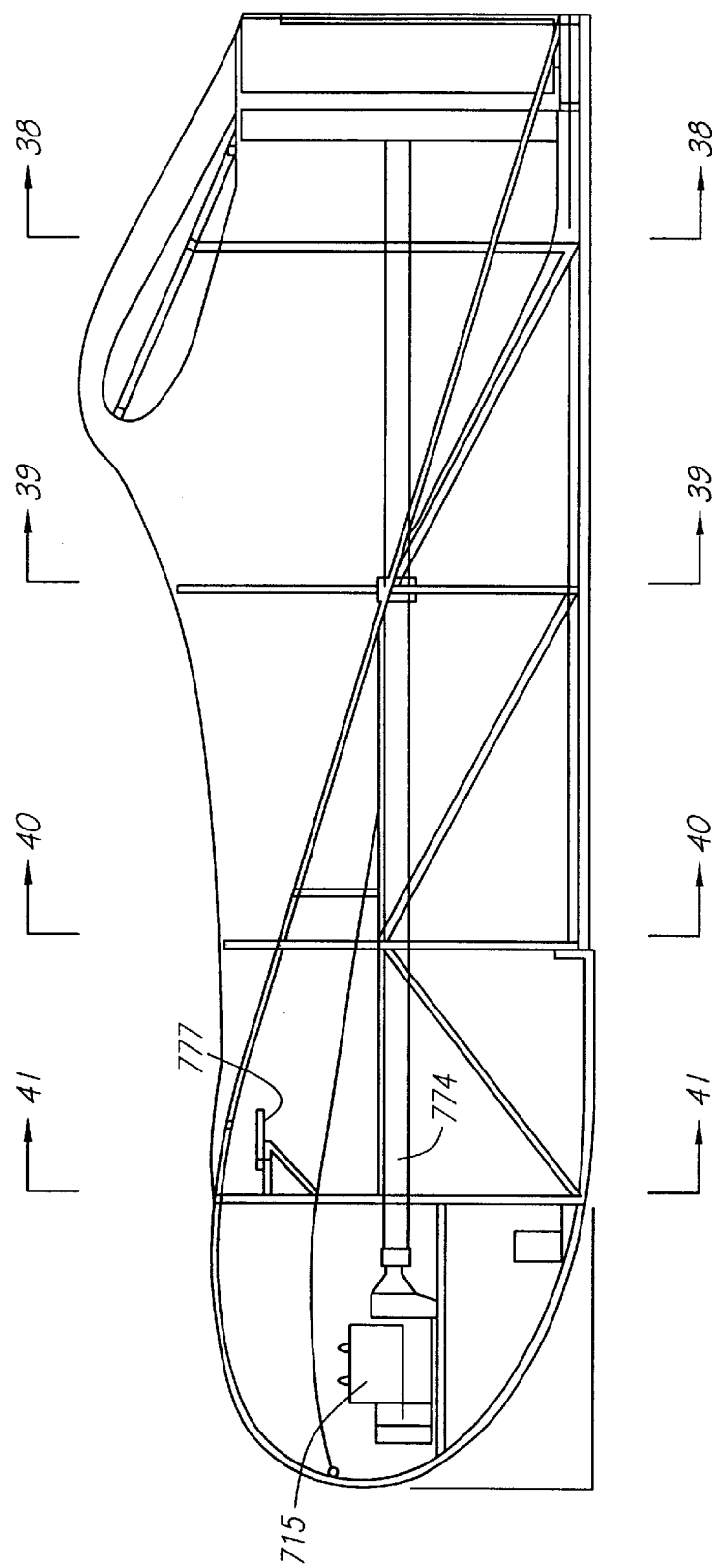
FIG. 37 is a cutaway side elevation view of the craft of FIG. 31 illustrating framing and drive train.

As best shown in FIGS. 33, 36 and 37, the watercraft 700 is constructed such that its mass elements, which include the engine 715 and drive train 774 and a propulsion mechanism (shown as a ducted fan 780 which is comprised of the outer duct 779 and rotating fan 781), are distributed to place the center of gravity C/G of the craft, without the presence of any pilot or riders, within the vehicle seating area 775. In a preferred configuration, the craft's center of gravity (C/G) is located generally centrally beneath the seating position of the pilot. The center of lift C/L is also preferably positioned in the same location as C/G. Access to the internal workings of the engine may be provided via a door 721 in the craft body.

The desired balance of the craft 700 (to control pitching moment) may be achieved by positioning the engine forward of the seating position 775 and locating the fan 780 in the rear as in the embodiment of FIGS. 18–24. The craft 700 may be constructed with an inherent stability which permits the pilot to alter the pitch of the craft by moving body position forward or rearward as in the previous embodiment. The pilot may steer the craft 700 by leaning to one side or the other in addition to turning the wheel or steering bars (see previous embodiment) which operate the rear dual rudders 782 and 784 aft of the fan 781.

Also as in the previous embodiment, fuel consumption is prevented from disturbing mass distribution, by positioning the fuel storage tank (see e.g. FIG. 20) beneath the seating position 775. Therefore, as the fuel in the tank is consumed, the weight of fuel remains balanced about the C/G so as maintain balanced mass distribution about the C/G even as the fuel is consumed.

Figure 34:
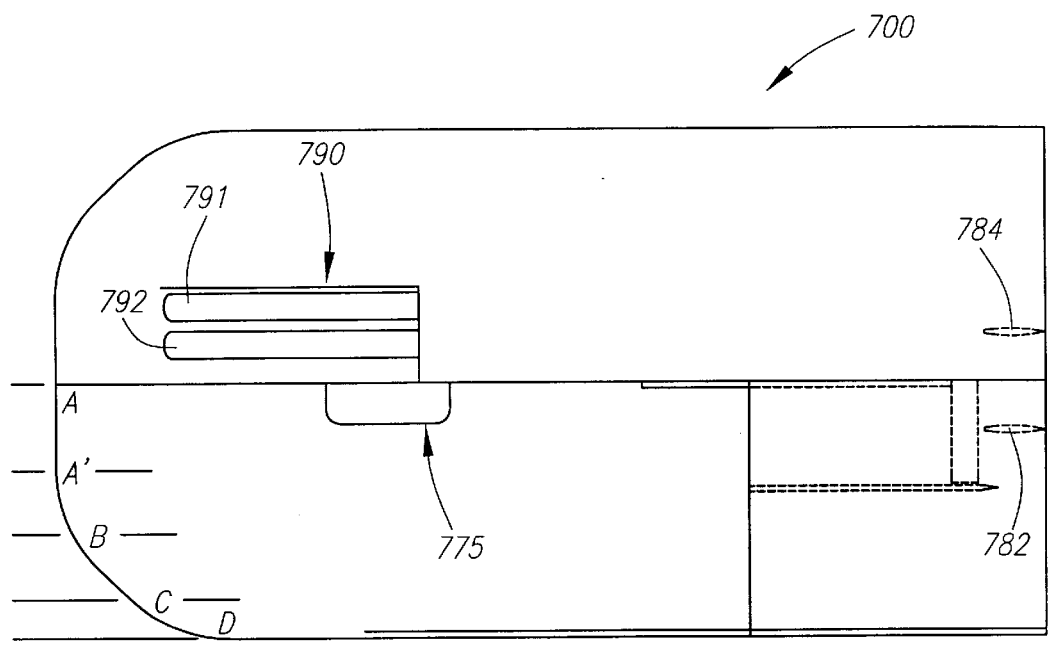
FIG. 34 is partially bisected top and bottom plan views of the craft of FIG. 31.
Figure 35:
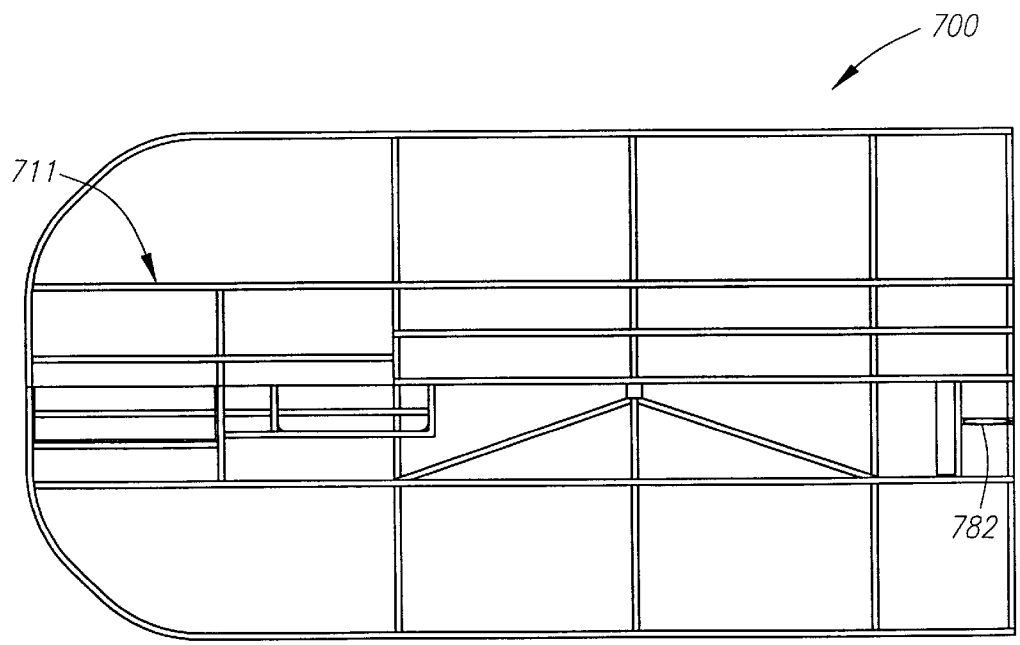
FIG. 35 is a partially bisected top and bottom framing view of the craft of FIG. 31.

Details of the main wing shape are illustrated in FIGS. 33–36. FIGS. 33 and 34 have cross-section lines A, A', B, C and D which refer to corresponding lines A, A', B, C and D in FIG. 36 illustrating the wing shape at the particular longitudinal cross-sectional location. As in the previous embodiment, these figures are drawn to scale to more fully describe the details of the wing shape of the watercraft 700. As shown in the figures, the leading edge of the body structure is extremely thick with a substantially horizontal, flat bottom. The wing shape has a maximum thickness (ratio of wing thickness to chord length) on the order of 27% which is about twice (or more) that of typical wing designs. The thicker wing generally works better at low air speeds and the built-in angle of attack relative to the hydrodynamic bottom actually reduces the effective thickness (as to drag). The thick wing also enables the thrust forces to act directly on the center of gravity and parallel to the hydrodynamic bottom.

The bottom surface is flat to accommodate aquatic planing. In addition, the bottom surface is equipped with hydrodynamic stabilizers 790 comprising a series of concavities 791, 792, 793, 794 positioned on the underside of the central hull section 720. It is intended that these concavities 791–794 provide both hydrodynamic stability and increased lift. The concavities 791–794 provide a pivot to turn on during water operation, otherwise the craft would tend to continue to move along a straight line in a crabbing manner. At flying speed, crabbing in the air induces a bank. The more forward side increases lift, the resultant banking in air as well as on the surface is favorable to good turning characteristics as banking induces the turn.

The bottom surface of the craft 700 may be equipped with a step as shown the previous embodiment of FIGS. 20 and 22.

The craft 700 is constructed with a generally flat, horizontal bottom planing surface. The bottom may have an upwardly curved forward surface.

Figure 38:
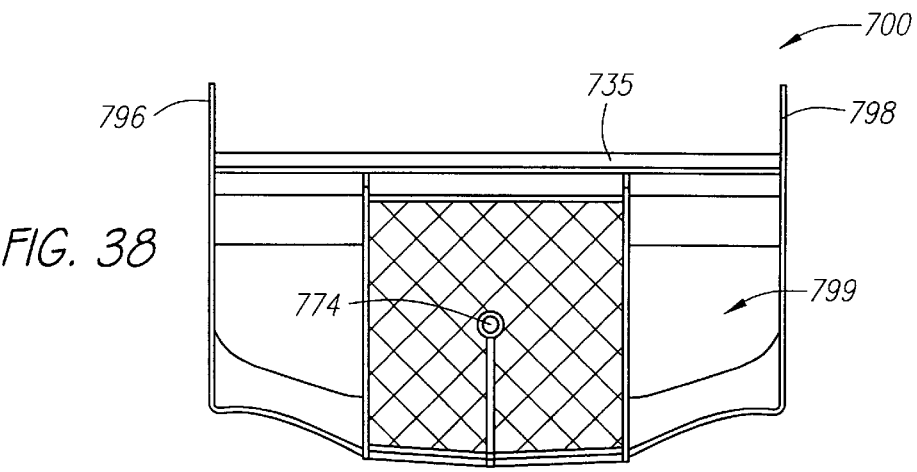
FIGS. 38–41 are cutaway framing views of FIG. 37 taken along respective lines 38 through 41.
Figure 39:
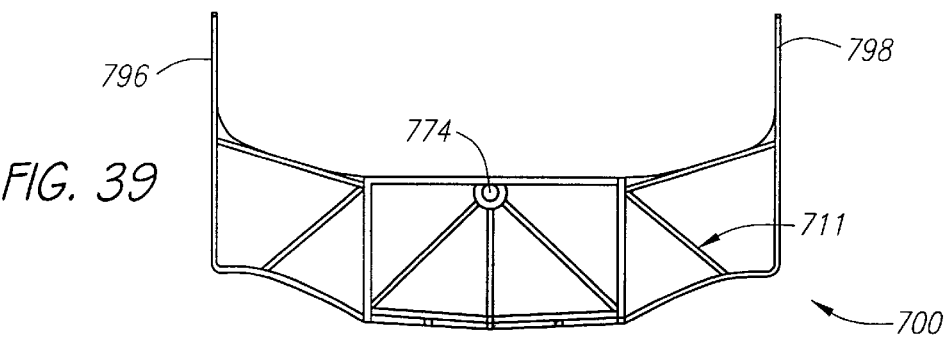

Details craft body shape are illustrated in FIGS. 38–39. FIGS. 38–41 illustrating the body shape at the particular cross-sectional location of the cross sectional lines in FIG. 37.

Figure 40:
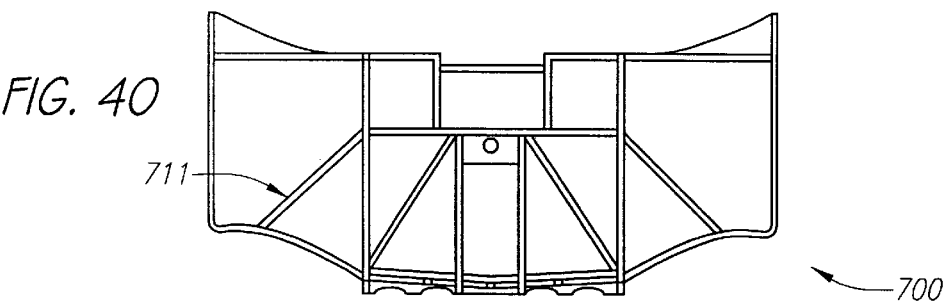
Figure 41:
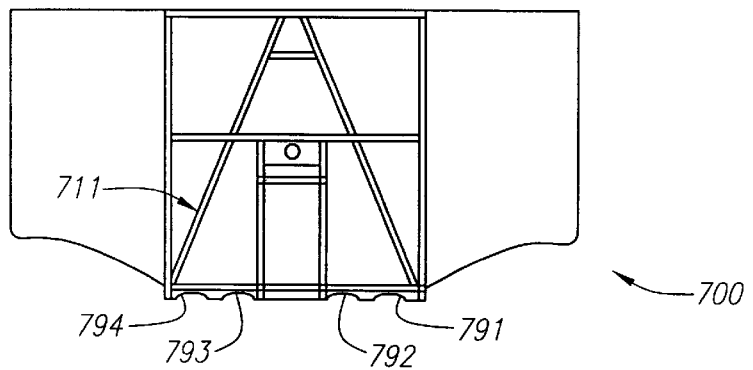

The rear of the craft 700 is constructed to form an expanded U-shaped (U) as best viewed in FIGS. 38–40, the "sharpness" of the "U" increasing toward the rear of the craft, as may been seen as the U-shape increases from FIG. 40 to FIG. 38. The rear of the craft 700 is preferably equipped with vertical side wall directional stabilizers 796, 798 for providing further directional stability. A secondary aft wing 735 extends between the vertical side wall directional stabilizers 796, 798 forming a box-shaped rear section 799. This secondary smaller aft wing section and horizontal stabilizer 735 provide increased overall lift and forms the top of the box-shaped section 799.

In the craft 700, the box-shaped rear section 799 shifts the C/L rearward which permits the C/G of the craft (and therefore the seating position of the pilot) to be located at or near the center of the vehicle aft of the main wing C/L, even if a very lightweight engine is employed.

A preferred craft may be designed by forming an overall configuration for the main body structure 710 and aft wing 735 to include a reverse camber, box-shaped rear cross section and an empirically found C/L. The bottom surface of the craft is configured to produce a meanline with an upward curvature and positive angle of attack to the flat bottom surface. The leading edge radius is then drawn with its center on the meanline and the top surface is projected equidistant from the meanline. The secondary aft wing 235 is equidistant about an upwardly curved meanline. The craft mechanical components are then arranged so that C/G, C/L and C/P coincide, balanced between the C/l of the main and aft wings. Thus both wings provide lift and are stable longitudinally with the C/G aft of the main wing C/L.

For a single or two person vehicle, the overall dimensions for a sport version craft may be as follows:
   length: 16.0 ft (4.88 m)
   span: 8.0 ft (2.44 m)
   height: 4.25 ft (1.30 m).

Such a vehicle may have a principal hull structure with an aspect ratio on the order of 0.5 as previously described with its wing/body shape having a wing thickness to chord length ratio on the order of 27%. The left and right wing sections merge with the central hull to form a continuous wing shape 710 constituting an aerodynamic shape which may provide lift over the entire craft surface and not just the wings as in conventional craft.

This flying structure is constructed in a practical form with utmost stability, preferably with an inherent stability such that a novice operator may operate it safely. In a preferred configuration, the craft 700 includes two basic controls only, a throttle which increases/decreases speed which varies lift thereby varying altitude and the rudders 782, 784 which steer right and left. Both throttle and rudders are controlled by hand controls 777. Additional conventional controls could be implemented but hands off would restore stability.

This inherent stability is accomplished by selective compromise of values to develop this unique configuration. The three axes of rotation greatly vary with the shifting of location of the center of gravity which absent other significant controls must be collocated vertically with the center of lift.

Lateral stability about the longitudinal axis has to do with a low C/G in a voluminous hull. Particularly, the forward section has in appearance a flat upper surface (see FIGS. 31–32) as viewed (front elevation) main wing structure. Whereas the lower surface is highly inclined outwardly and upwardly, with an accentuated taper in the bow lateral quarters for dynamic lateral stability. This configuration reduces lift in that area shifting the C/L and C/G aft. The shift of C/G aft reduces directional stability. The upper and lower U-shaped surfaces which develop rearwardly have the same effect which is corrected in this embodiment with vertical stabilizers 796, 798, end plates, duct side walls, and encompassed propulsion element. Operation of the rudders 782, 784 causes crabbing in the air; lateral banking is caused as lift is increased on one side. This in turn causes the actual turn itself as is well known.

The vertical stabilizers 796, 798 are an emphasis of the generally U-shaped rear section. The body has good directional stability prior to the addition of the vertical stabilizers 796, 798. In addition to directional stability, the vertical stabilizers 796, 798 also (1) increase lift, (2) form the duct, and (3) provide mounting means for the secondary wing 735.

The cumulative effect is a flying body of very low aspect ratio, on the order of 0.5 though in actuality 0.8 would be preferred, but it is preferred that the design to be of trailerable width.

The secondary wing 735 makes the overall design more practical as correct balance of component parts relative to available space is enhanced. Addition of the aft wing 735 moves the C/L aft resulting in less cramping in the bow section and simplifying weight distribution and balance. Historically, some very early aircraft featured such a dual lift or lifting tail. With a normal curved mean chord, there were sudden great misfortunes, and the practice was abandoned. However with the disclosed upwardly curved wing design, which is inherently stable, or wings of straight or reflex mean lines and controls, this configuration should be most suitable.

The duct formed by the main body, side wall stabilizers and secondary wing structure may provide one or more of the following advantages:

increased lift;

positively loading of the driving means;

reduced stalling characteristics;

support for screening 776 for the protection of operators and ingestion of debris;

improved the practicality of space in the design;

through weight and balance, correction for directional instability caused by improving lateral stabilities.

The craft 700 may optionally include conventional control surfaces including a tail unit, fins, rudders (such as on the rear of the vertical stabilizers 796, 798), winglets, ailerons, spoilers, fences or flaps. The secondary wing/horizontal stabilizer 735 provides both lift and pitch control for the craft 700.

FIGS. 33–35 and 37–41 also illustrate internal framing 711 for the craft 700. The framing 711 may comprise lightweight metal or metal composite, suitable wood or plastic. In a preferred construction, the metal framing may be replaced with honeycomb plastic panels which are corrosion free (or at least corrosion resistant) and yet provide a lightweight but strong support structure.

While embodiments and applications of this invention have been shown and described, it would be apparent to those skilled in the art that other modifications are possible without departing from the inventive concepts herein. The invention, therefore, is not to be restricted except in the spirit of the claims that follow.

What is claimed:

1. A flying craft having an aerodynamic configuration comprising a continuous wing-shaped body structure having a central hull section and first and second main wing sections laterally positioned one on either side of the central hull section, the first and second main wing sections merging into the central hull section to form the continuous wing-shaped structure;

a generally U-shaped rear section as viewed from a rear location, the U-shaped rear section being formed by a U-shaped rear portion of the central hull and by opposed first and second vertical stabilizers disposed at an outer periphery of the first and second main wing sections.

2. A flying craft according to claim 1 further comprising an aft wing extending between the first and second vertical stabilizers, the aft wing configured to provide lift.

3. A flying craft according to claim 2 further comprising a propulsion means disposed at a rear of the craft below the aft wing.

4. A flying craft according to claim 1 wherein the first and second main wing sections merge into and form the first and second vertical stabilizers.

5. A flying craft according to claim 1 further comprising a propulsion means disposed at a rear of the craft between the first and second vertical stabilizers.

6. A flying craft according to claim 5 wherein the propulsion means comprises a ducted fan.

7. A flying craft having an aerodynamic configuration comprising a single form flying body structure having a central hull section and first and second wing sections laterally positioned one on either side of the central hull section, the first and second sections merging into the central hull section to form the single form structure;

opposed first and second side wall vertical rear stabilizers, the first and second wing sections being swept back to merge into and form the first and second rear stabilizers, wherein the central hull section includes a generally flat bottom surface to accommodate aquatic planing.

8. A flying craft according to claim 7 further comprising a propulsion means disposed at a rear of the craft between the first and second rear stabilizers.

9. A flying craft according to claim 8 wherein the propulsion means comprises a ducted fan.

10. A flying craft according to claim 7 wherein the wing sections comprise an upwardly curving mean line.

11. A flying craft according to claim 7 wherein the central hull section includes concavities longitudinally arranged along the bottom surface.

12. A flying craft according to claim 7 wherein the single form flying body structure has a generally constant width.

13. A flying craft having an aerodynamic configuration comprising a single form flying body structure having a central hull section and first and second wing sections laterally positioned one on either side of the central hull section, the first and second sections merging into the central hull section to form the single form structure;

opposed first and second side wall vertical rear stabilizers, the first and second wing sections being swept back to merge into and form the first and second rear stabilizers;

an aft wing extending between the first and second rear stabilizers, the aft wing being constructed and arranged to provide lift.

14. A flying craft according to claim 13 further comprising a propulsion means disposed at a rear of the craft below the horizontal stabilizer.

15. A flying craft having an aerodynamic configuration comprising a single form flying body structure having
a central hull section,
first and second main wing sections laterally positioned one on either side of the central hull section, the first and second sections merging into the central hull section to form the single form structure;

opposed first and second side wall vertical rear stabilizers, the first and second wing sections being swept back to merge into and form the first and second rear stabilizers;

an aft elevated secondary wing structure extending between the first and second rear stabilizers;

wherein the aft wing structure and the first and second rear stabilizers form a box-shaped rear duct section, wherein the single form flying body structure has a generally constant width.

16. A flying craft according to claim 15 wherein the body structure comprises a single form having a thick cross section with a built in angle of attack.

17. A flying craft according to claim 15 wherein the wing sections comprise an upwardly curved meanline.

18. A flying craft according to claim 15 wherein the central hull section includes a generally flat bottom surface to accommodate aquatic planing.

19. A flying craft according to claim 18 wherein the central hull section includes concavities longitudinally arranged along the bottom surface.

20. A flying craft having an aerodynamic configuration comprising a single form flying body structure having
a central hull section,
first and second main wing sections laterally positioned one on either side of the central hull section, the first and second sections merging into the central hull section to form the single form structure;

opposed first and second side wall vertical rear stabilizers, the first and second wing sections being swept back to merge into and form the first and second rear stabilizers;

an aft elevated secondary wing structure extending between the first and second rear stabilizers, wherein the aft wing structure and the first and second rear stabilizers form a box-shaped rear duct section;

a propulsion means disposed in the box-shaped rear duct section for propelling the craft.

21. A flying craft according to claim 20 wherein both the main wing sections and the aft wing structure provide lift, wherein the craft is constructed and arranged with a center of gravity (C/G) aft of center of lift (C/L) of the flying body structure.

22. A flying craft according to claim 21 wherein the wing sections comprise an upwardly curved meanline.

23. A flying craft according to claim 20 wherein both the main wing sections and the aft wing structure provide lift, wherein the craft is constructed and arranged with a center of gravity (C/G) aft of center of lift (C/L) of the flying body structure.

24. A flying craft having an aerodynamic configuration comprising a single form flying body structure having
a central hull section,
first and second main wing sections laterally positioned one on either side of the central hull section, the first and second sections merging into the central hull section to form the single form structure,
a thick cross section with a built in angle of attack and an upwardly curved meanline; and
an aft elevated secondary lift wing structure.

* * * * *